(12) United States Patent
Hsu et al.

(10) Patent No.: US 10,380,371 B2
(45) Date of Patent: Aug. 13, 2019

(54) DYNAMIC FILTERING AND PRECISION ALTERATION OF QUERY RESPONSES RESPONSIVE TO REQUEST LOAD

(71) Applicant: Live Nation Entertainment, Inc., Beverly Hills, CA (US)

(72) Inventors: Debbie Hsu, Irvine, CA (US); Victoria Chung, San Francisco, CA (US); Gary Yu, Encino, CA (US); Jonathan Philpott, Diamond Bar, CA (US); Laura Hunter, Chandler, AZ (US); Hong Zhou, Phoenix, AZ (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 32 days.

(21) Appl. No.: 15/218,361

(22) Filed: Jul. 25, 2016

(65) Prior Publication Data

US 2016/0335452 A1 Nov. 17, 2016

Related U.S. Application Data

(63) Continuation of application No. 14/734,727, filed on Jun. 9, 2015, now Pat. No. 9,430,663.
(Continued)

(51) Int. Cl.
*G06F 21/62* (2013.01)
*G06F 16/176* (2019.01)
(Continued)

(52) U.S. Cl.
CPC ........ *G06F 21/6227* (2013.01); *G06F 16/176* (2019.01); *G06F 16/9535* (2019.01);
(Continued)

(58) Field of Classification Search
CPC ................................................ G06F 17/30867
(Continued)

(56) References Cited

U.S. PATENT DOCUMENTS 7,620,685 B2 11/2009 Marcjan
7,770,174 B1 8/2010 Martin et al.
(Continued)

FOREIGN PATENT DOCUMENTS

WO 2015-191647 A2 12/2015

OTHER PUBLICATIONS

U.S. Appl. No. 14/734,727, filed Jun. 9, 2015, "Advisory Action", dated Mar. 28, 2016, 4 pages.
(Continued)

*Primary Examiner* — Syling Yen
(74) *Attorney, Agent, or Firm* — Kilpatrick Townsend & Stockton, LLP

(57) ABSTRACT

Embodiments relate to processing a request from a user device for access rights for a resource. An access management system can send a request to query a (e.g., cached or authoritative) data store for available access rights. The query may include an exact-match or fuzzy query. A set of access-right results responsive to the query can be identified. The system may transmit a communication to the user device that identifies the set, or a subset thereof. Upon receiving a selection of a result, the system can facilitate assigning access rights corresponding to the identified result to the user. In some instances, a level of precision at which a characteristic of an access-right result is identified and/or whether or how access rights are held depends on a request load.

20 Claims, 13 Drawing Sheets

Related U.S. Application Data

(60) Provisional application No. 62/010,856, filed on Jun. 11, 2014.

(51) Int. Cl.
 G06F 16/9535 (2019.01)
 H04L 29/06 (2006.01)

(52) U.S. Cl.
 CPC ............ G06F 21/62 (2013.01); H04L 63/105 (2013.01); H04L 63/18 (2013.01)

(58) Field of Classification Search
 USPC ....... 707/706, 713, 722, 736, 758, 759, 765, 707/766, 769, 781; 705/1, 5, 14, 26, 27; 718/104; 709/204, 216, 218
 See application file for complete search history.

(56) References Cited

U.S. PATENT DOCUMENTS

| | | | |
|---|---|---|---|
| 9,430,663 | B2 | 8/2016 | Hsu et al. |
| 2002/0083178 | A1 | 6/2002 | Brothers |
| 2006/0031504 | A1 | 2/2006 | Hegli et al. |
| 2008/0109813 | A1 | 5/2008 | Narita et al. |
| 2008/0255889 | A1* | 10/2008 | Geisler ................. G06Q 10/02 705/5 |
| 2009/0063206 | A1 | 3/2009 | Payne et al. |
| 2012/0323612 | A1* | 12/2012 | Callaghan ............. G06Q 10/02 705/5 |
| 2013/0124234 | A1 | 5/2013 | Nilsson et al. |
| 2014/0156320 | A1 | 6/2014 | Levin |
| 2015/0363603 | A1 | 12/2015 | Hsu et al. |

OTHER PUBLICATIONS

U.S. Appl. No. 14/734,727, filed Jun. 9, 2015, "Final Office Action", dated Nov. 25, 2015, 20 pages.
U.S. Appl. No. 14/734,727, filed Jun. 9, 2015, "First Action Interview Office Action Summary", dated Sep. 2, 2015, 4 pages.
U.S. Appl. No. 14/734,727, filed Jun. 9, 2015 , "Notice of Allowance", dated May 2, 2016, 6 pages.
International Search Report and Written Opinion of PCT/US2015/034988 dated Sep. 15, 2015, all pages.
Notice of Publication dated Dec. 17, 2015 in PCT/US2015/034988, all pages.
International Preliminary Report on Patentability of PCT/US2015/034988 dated Dec. 22, 2016, 6 pages.

* cited by examiner

DYNAMIC FILTERING AND PRECISION ALTERATION OF QUERY RESPONSES RESPONSIVE TO REQUEST LOAD

CROSS-REFERENCE TO RELATED APPLICATIONS

This application is a continuation application of U.S. Ser. No. 14/734,727, filed on Jun. 9, 2015, which claims the priority benefit of U.S. Provisional Application No. 62/010,856, filed on Jun. 11, 2014, the disclosure of each of which is hereby incorporated by reference in its entirety for all purposes.

FIELD

This disclosure relates in general to methods and systems for returning incomplete and/or imprecise results to queries for access rights to a resource. More specifically, query constraints can be introduced and/or modified and/or query results can be processed (e.g., to decrease precision or filter out a subset of original results).

BACKGROUND

Access to resources is frequently limited. Various access-right structures can be structured and allocated. Each access right can correspond to one or more access characteristics. Individual requests for resource accessed can then be processed to identify access rights with characteristics that correspond to the request. Access rights can then be assigned to particular users and/or user devices associated with the requests. Such assignments can result in a reduced availability to the resource. In some instances, a high volume of requests for access to a resource is received shortly after a request-acceptance time period begins. This volume can result in response conflicts (where access rights are concurrently identified in response to multiple queries) and/or an uneven and biased distribution of results provided in response to multiple, similar requests.

SUMMARY

In some embodiments, a request for one or more access rights for a resource are received. The request may include one or more parameters indicating requested access characteristics. One or more queries can be generated for the request. Each query can include one or more constraints. In one instance, a degree to which a constraint matches (e.g., versus being relaxed, varied or further constrained) a request parameter may vary depending on (for example) a time since a request-acceptance time period begins, a current or recent request volume (or load), a current or recent availability of access requests for the resource, a cache time, and/or a past access-right assignment. In one instance, multiple queries can be generated, which can vary in a degree to which a constraint matches a request parameter. A number of queries generated (e.g., and a degree to which one or more constraints of each query match a request parameter) can depend on, for example, a time since a request-acceptance time period begins, a current or recent request volume (or load), a current or recent availability of access requests for the resource, a cache time, and/or a past access-right assignment. In one instance, multiple queries can be generated, which can vary in a degree to which a constraint matches a request parameter.

Each of one or more queries can be executed, such that records in a data store are searched so as to identify available access rights with one or more characteristics matching query constraints. A result of a query can include an identification of (and/or of a characteristic of) zero, one or a set of access rights. In some instances, an incomplete subset of a set of access rights is identified. The incomplete subset can be selected based on, for example, a pseudo-random selection technique, parameters in other pending requests, and/or past access-right assignments. In some instances, a level of precision at which to identify an access-right characteristic (e.g. of each query-result access right or access right in a subset) is identified.

A notification identifying a characteristic of each of one or more access rights (e.g., in a query result or subset and/or at an identified level of precision) can be generated and transmitted. In some instances, the one or more access rights can be held so as to prevent assigning the right(s) within a defined (e.g., absolute or functional) time period. The notification can be transmitted to a user device associated with the access-right request. An assignment request (e.g., identifying at least one access right or access-right characteristic) can be received. The at least one access rights can then be assigned to the user device and/or associated user. The assignment can include updating the data store (e.g., to associate an identifier of each assigned access right with an identifier of a user or user device; and/or to update a status of each assigned access right) and/or transmitting data about the assigned access right(s) to the user device.

A degree to which a set of access rights is filtered into a subset, a subset-selection technique, a level of precision and/or a determination as to whether access rights are to be held can depend on, for example, a time since a request-acceptance time period begins, a current or recent request volume (or load), a current or recent availability of access requests for the resource, a cache time, and/or a past access-right assignment.

In some embodiments, a computer-implemented method for facilitating assignments of access rights for resources can be provided. Via a user-device interface of an access management system, a first communication can be received from a user device. The first communication can correspond to a request to be granted access to a resource. The user device can be remote from the access management system. At the access management system, a request load for a resource can be identified. The request load can correspond to a quantity of requests that are requesting access to the resource be granted. For example, the quantity of requests can include incoming, pending or completed requests corresponding to a particular time period (e.g., within a most-recent past minute, current 10-minute time period of next hour). At the access management system, an initial access constraint can be identified that specifies a value or range of a characteristic of an access right or group of access rights. The initial access constraint can be determined based on input data in the first communication corresponding to input received via a user interface of the user device that identifies the constraint; or assignment data that identifies a characteristic of another access right or group of access rights for another resource and that were assigned to a user associated with the first communication. Via a data-store interface of the access management system, a second communication can be transmitted to each of one or more data store servers that manage one or more data stores to identify which access rights amongst a plurality of access rights are available for the resource. Each access right in the plurality of access rights can be configured to permit a device or user assigned the access right to access to the resource. An access characteristic of the access permitted by each access right in the plurality of access rights can be unique across the plurality of access rights. Each of the one or more data store servers can be remote from the access management system. Via the data-store interface, a third communication can be received from each of at least one of the one or more data store servers. The third communication can identify an availability of at least part of the set of access rights. At the access management system, a set of access-right results can be identified based on the response communication received from each of the at least one of the one or more data store servers. Each access-right result can comply with the initial constraint and each access-right result in the set of access-right results including an identification of one or more access rights in the set of access rights that were identified as being available. At the access management system, a level of precision for identifying a characteristic of access rights can be determined based on the request load. Via the user-device interface, a fourth communication can be transmitted to the user device. The fourth communication can identify, for each of at least one access-right result in the set of access rights and at the level of precision. The characteristic of an access right can be identified in the access-right result.

In various instances, via the user-device interface, a fifth communication can be received from the user device, the fifth communication including an identification of an access-right result in the at least one access-right result. Via the data-store interface, a sixth communication can be transmitted that includes an instruction to identify one or more available access rights that are currently available for assignment and that correspond to the characteristic, at the level of precision, for the access right in the access-right result identified in the fifth communication. For example, a fourth communication may identify a result that indicates that a block of three contiguous seats are available in row 3, without identifying the particular seats. The sixth communication can initiate a query to identify whether three particular seats that gave rise to the result are available and/or to identify any set of contiguous three seats that are in the row. In some instances, the at least one of the one or more data stores can include one or more cache data stores that includes cached indications indicating that access rights in the set of access rights are available for the resource, and the sixth communication can transmit to a data store server that manages an authoritative data store.

A method can also include selecting an incomplete subset of the set of access-right results by using a subset-selection technique. The at least one access-right result can be the incomplete subset of the set of access-right results, such that characteristics of access rights identified in other access-right results included in the set of access-right results but not in the subset are not identified in the fourth communication. The subset-selection technique can include pseudo-randomly selecting between at least some of the set of access-right results.

A method can further include transmitting a hold-instruction communication to the at least one of the one or more data store servers. The hold-instruction communication can include an instruction to place, for each of the at least one access-right results, the one or more access rights in the access-right result on hold for a period of time so as to inhibit assigning any of the access rights during the period of time. A method can further include determining, prior to the transmission of the hold-instruction communication and based on the request load, the period of time or that a hold is to be placed.

The characteristic can be indicative of a location associated with at least one of the one or more access rights. The one or more data stores can include indications about which access rights are available via a primary channel and which access rights are available via a secondary channel. Identifying a request load can include predicting a request load.

In some instances, a computer-implemented method for facilitating assignments of access rights for a resource by facilitating query execution and filtering query results can be provided. At an access management system, a first communication can be received from a user device. The first communication can correspond to a request to be granted access to a resource, and the user device being remote from the access management system. At the access management system, an initial access constraint can be identified that specifies a value or range of a characteristic of an access right or group of access rights. The initial access constraint can be determined based on input data in the first communication corresponding to input received via a user interface of the user device that identifies the constraint; or assignment data that identifies a characteristic of another access right or group of access rights for another resource and that were assigned to a user associated with the first communication. From the access management system, a second communication can be transmitted to each of one or more data store servers that manage one or more data stores to identify which access rights amongst a plurality of access rights are available for the resource. Each access right in the plurality of access rights can be configured to permit a device or user assigned the access right to access to the resource. An access characteristic of the access permitted by each access right in the plurality of access rights can be unique across the plurality of access rights. Each of the one or more data store servers can be remote from the access management system. At the access management system, a third communication can be received from each of at least one of the one or more data store servers. The third communication can identify an availability of at least part of the set of access rights. At the access management system, a set of access-right results can be determined based on the response communication received from each of the at least one of the one or more data store servers. Each access-right result can comply with the initial constraint. Each access-right result in the set of access-right results can include an identification of one or more access rights in the set of access rights that were identified as being available. At the access management system, an incomplete subset of the set of access-right results can be selected by using a subset-selection technique. From the access management system, a fourth communication can be transmitted to the user device. The fourth communication can include data for each access-right result in the subset. The data can include an identifier or characteristic of an access right identified in the access-right result. At the access management system, a fifth communication can be received from the user device. The fifth communication can include an identification of an access-right result in the subset. From the access management system, a sixth communication can be transmitted that includes an instruction to assign the one or more access rights in the access-right result to the user.

In some instances, upon selecting the incomplete subset, a hold-instruction communication can be transmitted to the at least one of the one or more data store servers. The hold-instruction communication can include an instruction to place access rights in the subset on hold for a period of time so as to inhibit assigning any of the access rights in the subset during the period of time. Upon receiving the fifth communication, a release-instruction communication can be transmitted that includes an instruction to release the hold on access rights in any other access-right results in the subset. In some instances, a request load for access rights for the resource can be identified. A level of precision for identifying a characteristic of access rights can be determined based on the request load. The data can identify the characteristic of an access right at the level of precision.

The at least one of the one or more data stores can include one or more cache data stores that includes cached indications indicating that access rights in the set of access rights are available for the resource. The sixth communication can be transmitted to a data store server that manages an authoritative data store. The subset-selection technique can include pseudo-randomly selecting between at least some of the set of access-right results. The subset-selection technique can include identifying a defined number access-right results in the set of access-right results. The data can include a location characteristic indicating a location of the access right identified in the access-right result. The one or more data stores can include indications about which access rights are available via a primary channel and which access rights are available via a secondary channel. The initial access constraint can include a quantity of access rights, and wherein the initial access constraint can be determined based on the assignment data.

In some embodiments, an access management system for facilitating assignments of access rights for resources by facilitating query execution and filtering query results can be provided. The system includes a user-device interface configured to exchange communications with user devices and a data-store interface configured to exchange communications with each of one or more data store servers that manage one or more data stores. The system further includes one or more data processors and a non-transitory computer readable storage medium containing instructions which when executed on the one or more data processors, cause the one or more data processors to perform part or all of one or more methods disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
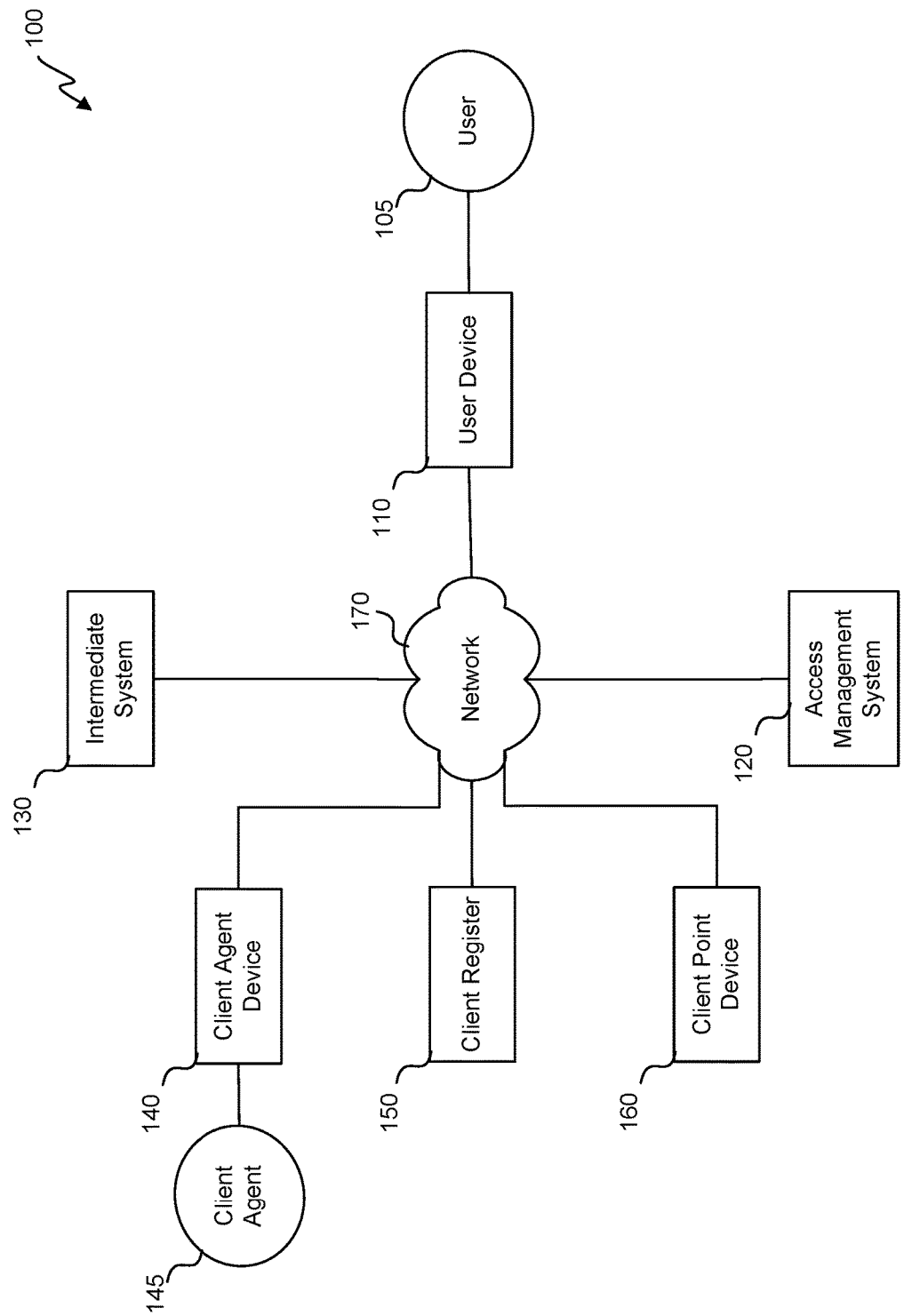
FIG. 1 depicts a block diagram of an embodiment of a resource access-facilitating interaction system.

Referring first to FIG. 1, a block diagram of an embodiment of a resource access-facilitating interaction system 100 is shown. A user device 110 (which can be operated by a user 105) can communicate with an access management system 120 directly or via another system (e.g., via an intermediate system 130). User device 110 can also communicate with one or more client devices, such as a client agent device 140 operated by a client agent 145, a client register 150 or a client point device 160. Each inter-system communication can occur over one or more networks 170 and can facilitate transmission of a variety of types of data. It will be understood that, although only one of various systems, devices, entities and network are shown, interaction system 100 can be extended to include multiple of any given system(s), device(s), entity(ies), and/or networks.

Access management system 120 can be configured to manage a set of access rights to one or more resources. More specifically, access management system 120 can track which resources are to be made available to users, specifications of the resources and times at which they will be available. Access management system 120 can also allocate access rights for resources and facilitate transmissions of notifications of the available rights to a set of user devices. For example, access management system 120 can alert users of the availability via a website, app page or email. As another example, access management system can transmit data about access rights and resources to one or more intermediate systems 130, which can facilitate distribution of access-right availability and processing of requests for such rights.

Thus, for a given resource, a plurality of access rights can be allocated. Each of the plurality of access rights can be configured to be assigned to a user or user device. Upon a presentation of an access-enabling code or other feature corresponding to the access right, a validity of the code or feature can be assessed to confirm that the access right was allocated and assigned (e.g., to a particular user or user device). Determining that the code or feature is valid can indicate that the user is to be permitted to access the resource. In some instances, an access characteristic of the access permitted by each access right in the plurality of access rights is unique across the plurality of access rights. For example, each access right can be configured to permit that an assigned user occupy a particular position while accessing the resource, and the particular positions can be unique across the plurality of access rights for a given resource.

Notifications of available access rights can be accompanied by options to request that one or more access rights be assigned to a user. Therefore, user 105 can provide input to user device 110 via an interface to request such assignment and provide other pertinent information. A request can be associated with one or more constraints, which may be specified via user input and/or identified based on a context in which a request was received (e.g., an access-right characteristic represented in a notification presented at a time or before (e.g., immediately before) request input was received. A constraint can identify a value or a range (e.g., a closed range or open-ended range) of a value of each of one or more characteristics of access rights. For example, a constraint can include a spatial constraint (e.g., identifying one or more sections or zones), a time constraint (e.g., identifying a date), or a price constraint. In some instances, a request includes one for access to a particular resource. In some instances, a request includes one including one or more constraints for selecting a resource (e.g., a resource location, involved entity, etc.). A request communication can be generated and transmitted from user device 110 to intermediate system 130 and/or access management system 120. The request communication can identify a resource and/or one or more constraints. The request communication can correspond to an indication that access-right identifications are being requested.

Intermediate system 130 and/or access management system 120 can process the request to query a data store to identify one or more access rights that correspond to the request. For example, each access right allocated for a resource can be associated with one or more characteristics (e.g., specifying an access time, access location, access level, and/or price). The query can identify a query result that identifies access rights associated with characteristics that match and/or are within a range of each of one or more constraints of a request.

Part of all of the query result can be identified within a request response. A notification can be generated, transmitted to and/or presented at a user device that identifies access rights (and/or characteristics thereof) in the request response. In some instances, intermediate system 130 and/or access management system 120 facilitate placing the identified access rights on hold for a defined (absolute, relative and/or functional) time period. In some instances, a hold need not be initiated.

In some instances, one or more communications can be exchanged between user device 110 and intermediate system 130 and/or access management system 120. Such communications can, for example, identify an incomplete subset of access rights identified in a notification requested for assignment, identify types of required information, identify values of required information, authorize payment, and so on. Upon receiving (e.g., and, in some instances, verifying) required information, intermediate system 130 and/or access management system 120 can assign one or more access rights to the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at user device 110 confirming the assignment and/or including data required for corresponding access to be permitted.

In some instances, a resource is at least partly controlled, offered or availed by a client. The resource may be offered at a particular location or structure, and a variety of client devices may be present at the location so as to facilitate usage of an access right and other offerings. Exemplary client devices can include client agent device 140, which can be one operated by a client agent (e.g., a human client agent), a client register 150 (e.g., which can operate independently of an agent and/or can be connected to or include a device that, while in a locked mode, can impede resource access, such as a turnstile) and client point device 160 (e.g., which can operate independently of an agent and/or can be positioned at or around the resource-associated location. For example, in some instances client agent device 140 can be operated by an agent at a location for a resource that is an event ("event resource") taking place at the location. In this example, client agent device 140 is used by an agent that is manning an entrance to the location (e.g., which can include, for example, a location of a structure or a geographic region) or a part thereof; client register 150 can be or can be connected to a turnstile, gate or lockable door that is positioned along a perimeter or entrance to a resource-associated location or part thereof; and client point device 160 can be an electronic device positioned at or within a resource-associated location.

In some instances, user device 105 performs particular functions upon detecting a client device and/or the contrary. For example, user device 110 may locally retrieve or request (e.g., from an external source) an access-enabling code. The access-enabling code can be transmitted to the client device or a remote server (e.g., a server hosting access management system 120) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as user device 110.

In some instances, user 105 can use multiple user devices 110 to perform various operations (e.g., using one device to request an access right and another to interact with client devices). Some instances of user device 110, access management system 120, intermediate system 130, client agent device 140, client register 150 and/or client point device 160 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 120. For example, a database or data store include a list of identifiers for each user or user device having an assigned access right for a resource or associating an identifier for each user or user device with an identifier of a particular access right. In some instances, an indicia can be transmitted to a user device that indicates that an access right is availed. In various instances, it may permitted or prohibited for the indicia to be transferred. The indicia may be provided as part of an electronic or physical object (e.g., a ticket) or independently. The indicia may include an access-enabling code.

In some instances, access management system 120 communicates with one or more intermediate systems 130, each of which may be controlled by a different entity as compared to an entity controlling access management system 120. For example, access management system 120 may assign access rights to an intermediate systems 130 (e.g., upon payment of a fee or upon acceptance of terms to conditionally pay a fee). Intermediate system 130 can then collect data pertaining to the assigned access rights and/or a corresponding event, can format and/or edit the data, generate a notification of availability of the access rights that includes the formatted and/or edited data and facilitate presentation of the notification at a user device 110. When intermediate system 130 receives a communication from a user device 110 indicative of an access-right request, intermediate system 130 can facilitate assignment (or reassignment) of an access right to the user (e.g., by transmitting relevant information to access management system 120 identifying the user and/or user device and/or by transmitting relevant information to user device 110 pertaining to the access right).

A resource can include one managed or provided by a client, such as a performing entity or an entity operating a venue. A user device 110 can transmit data corresponding to the access right (e.g., an access-enabling code) to a client device upon, for example, detecting the client device, detecting that a location of the user device 110 is within a prescribed geographical region, or detecting particular input. The receiving client device may include, for example, a client agent device 145 operated at an entrance of a defined geographical location or a client register 150 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on user device 110 is, at least in part, complementary to at least part of one on access management system 120 and/or a client device; and/or such that a software agent or app on intermediate system 130 is, at least in part, complementary to at least part of one on access management system 120).

In some instances, a network in the one or more networks 170 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 170 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource access-facilitating interaction system 100 can include fewer devices and/or systems. Further, some systems and/or devices can be combined. For example, a client agent device 140 may also serve as an access management system 120 or intermediate system 130 so as to as to facilitate assignment of access rights.

As described in further detail herein, an interaction between user device 110 and a client device (e.g., client agent device 140, client register 150 or client point device 160) can facilitate, for example, verification that user 105 has a valid and applicable access right, obtaining an assignment of an access right, and/or obtaining an assignment of an upgraded access right.

Figure 2:
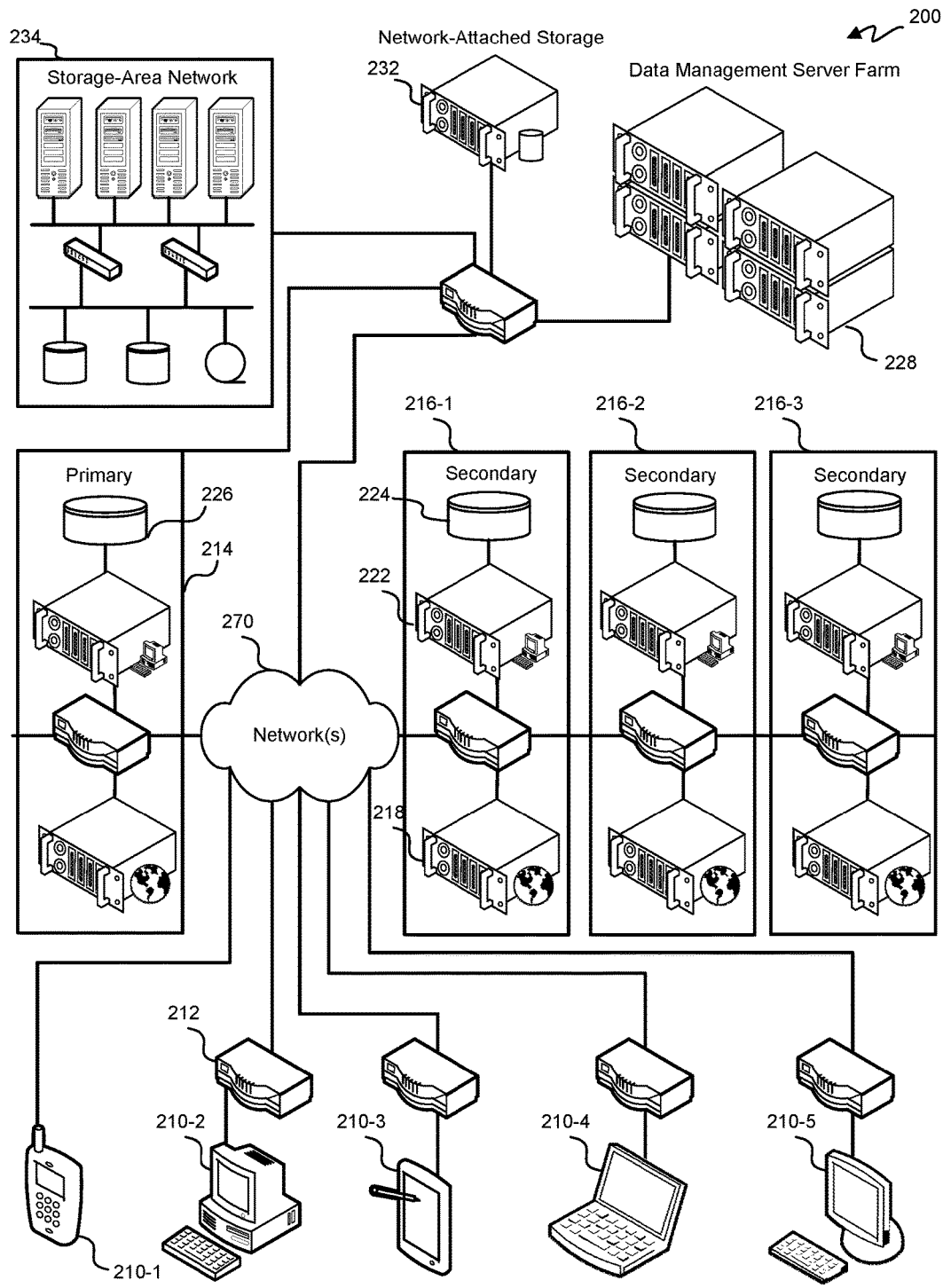
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
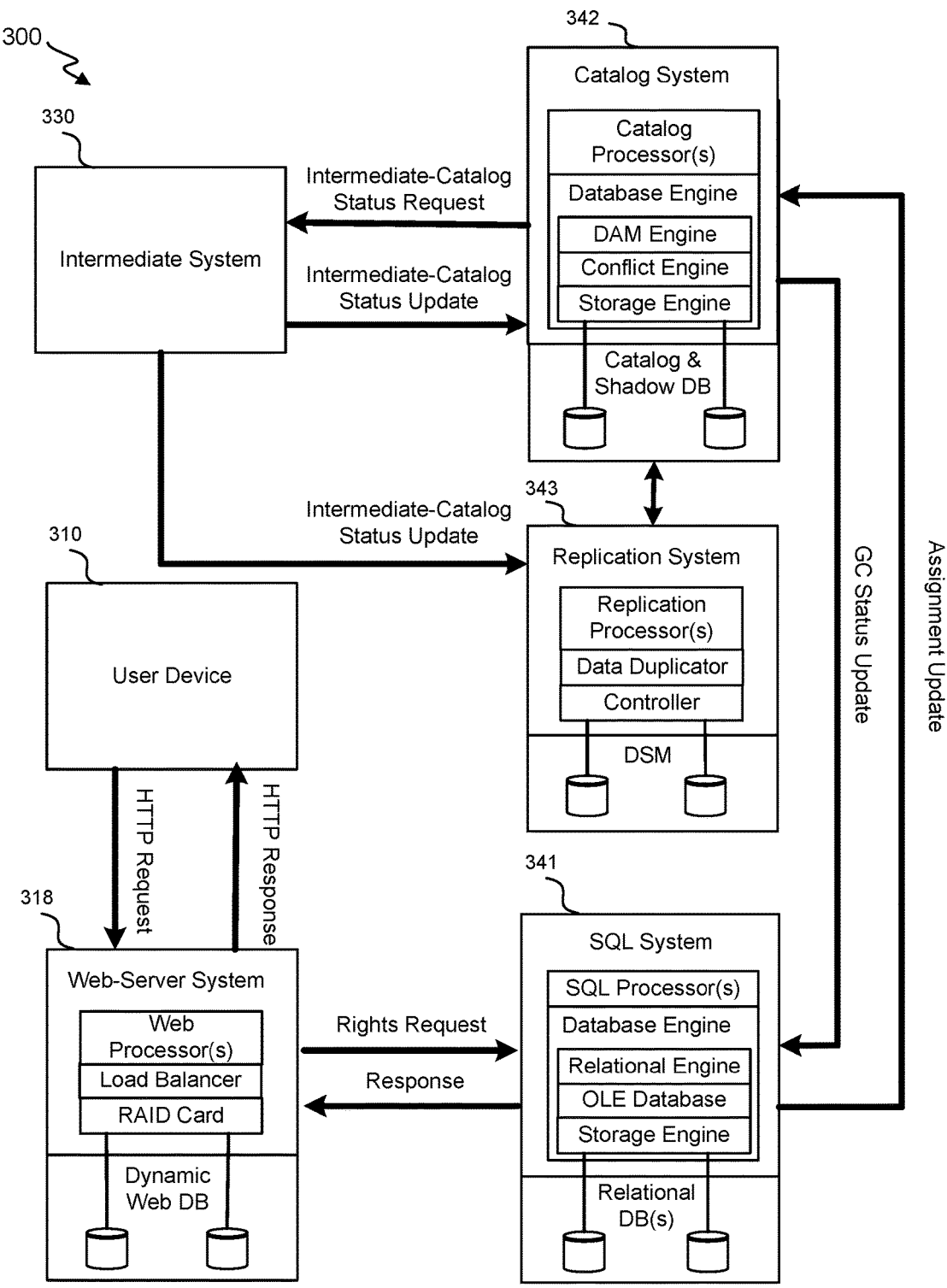
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part of web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
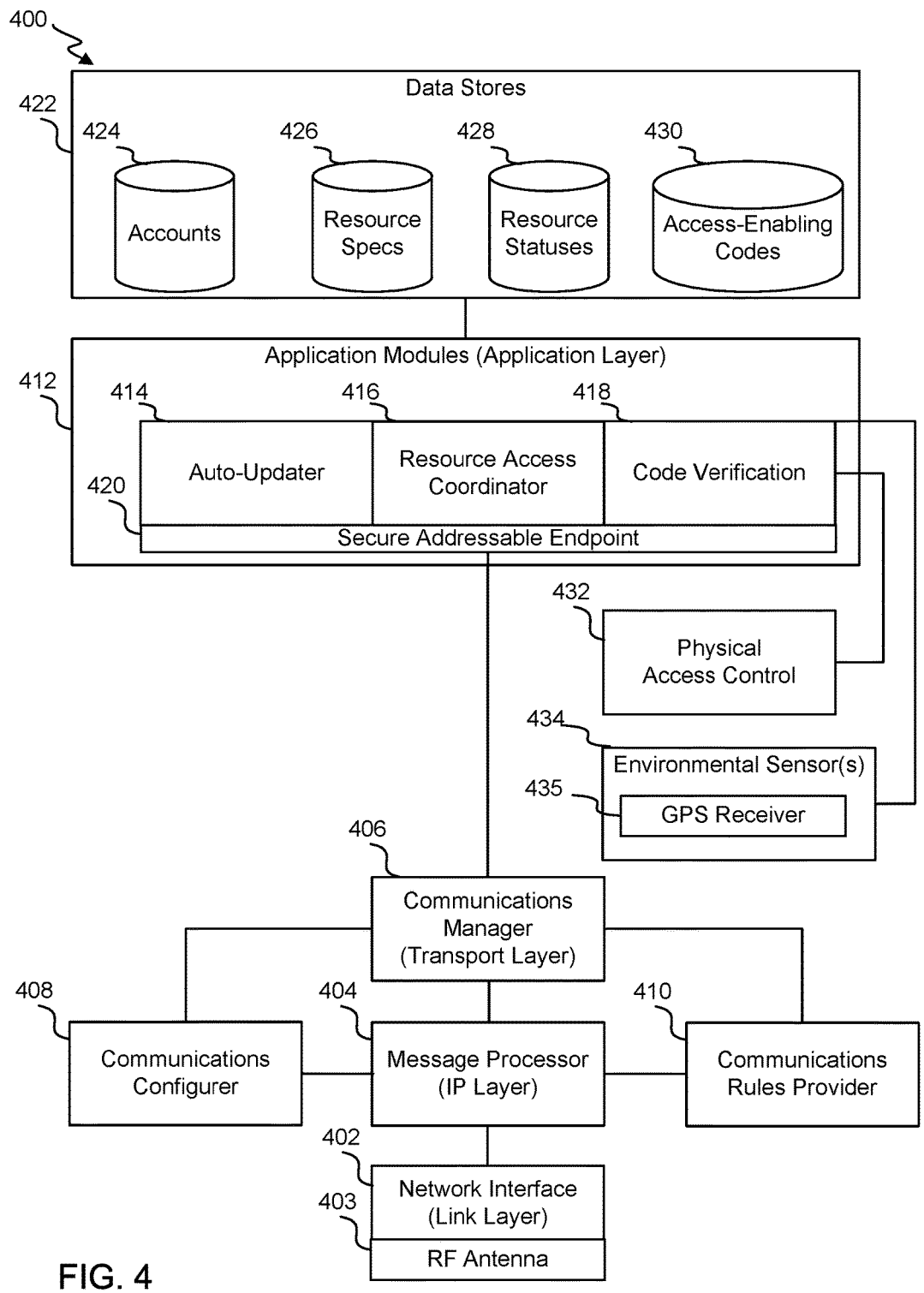
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
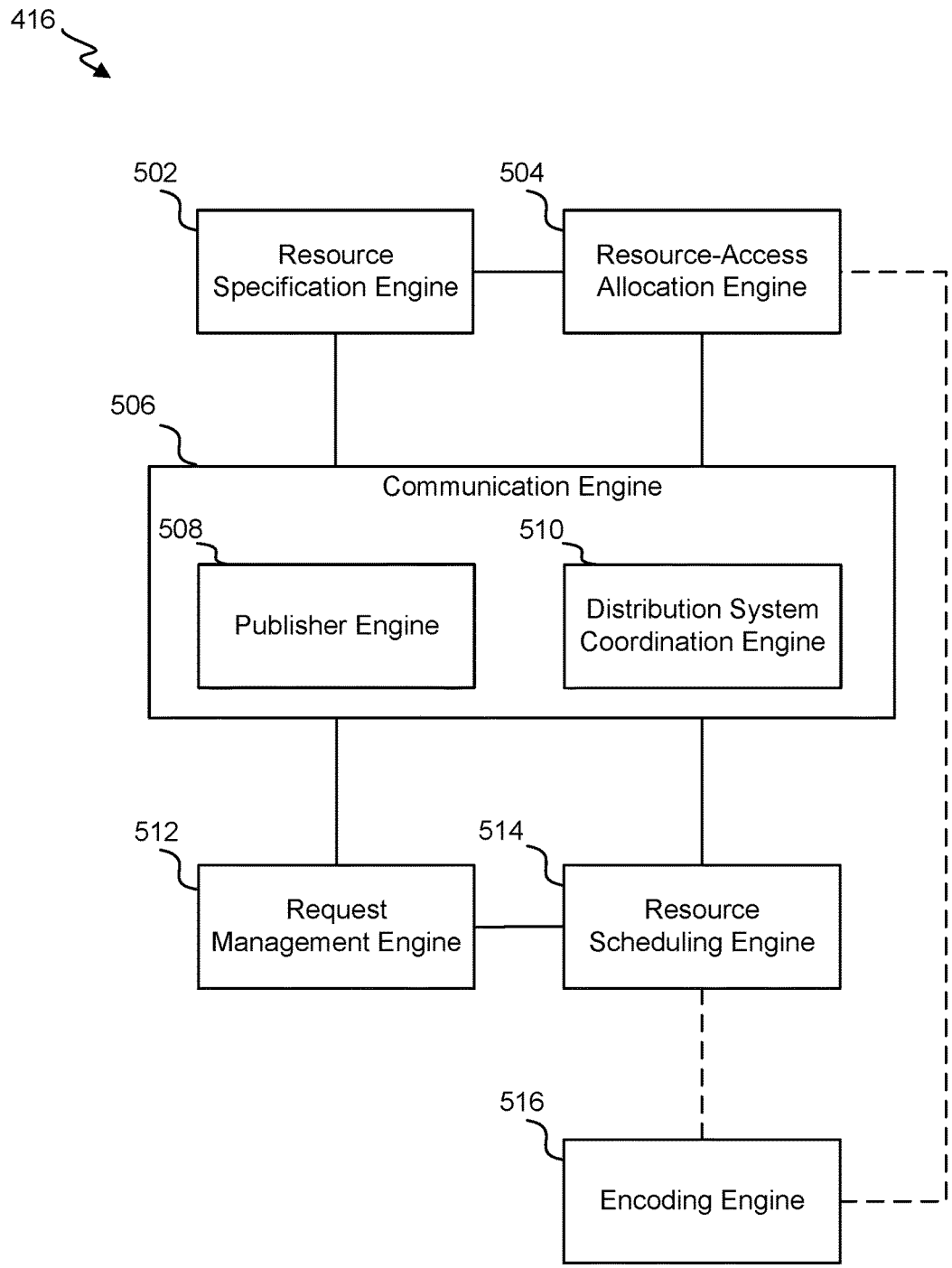
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
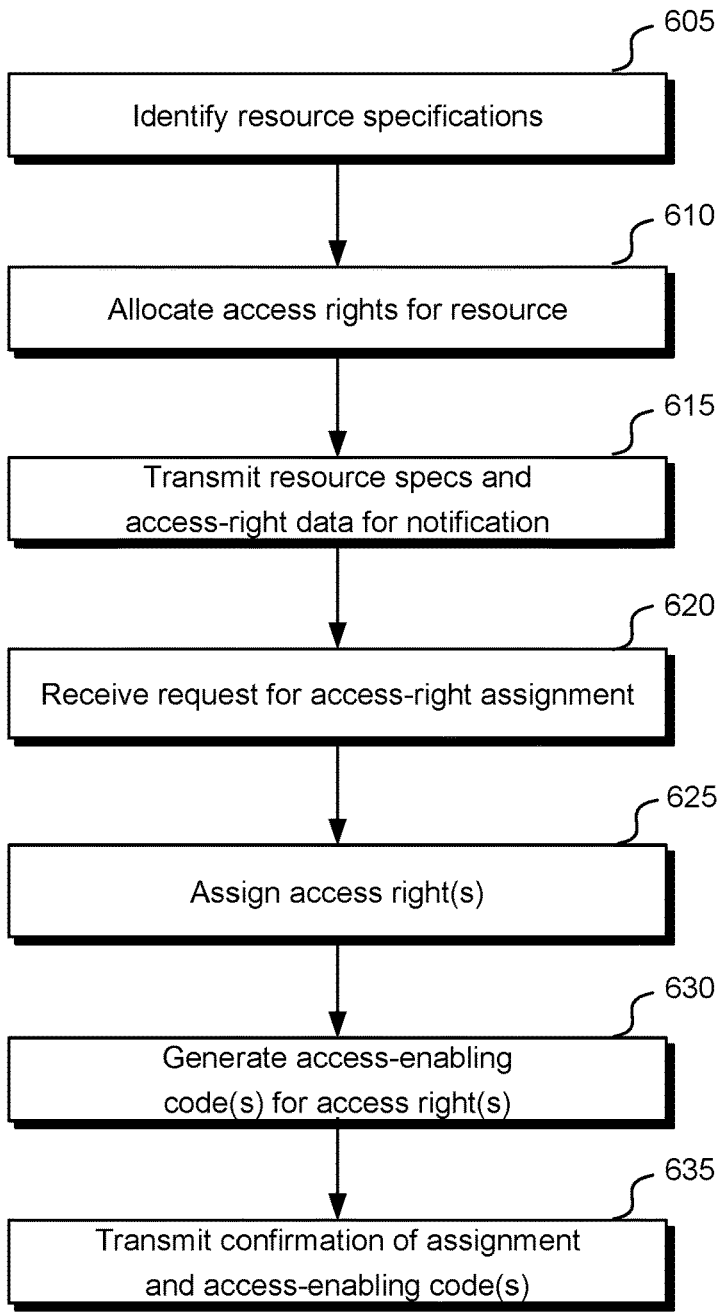
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7:
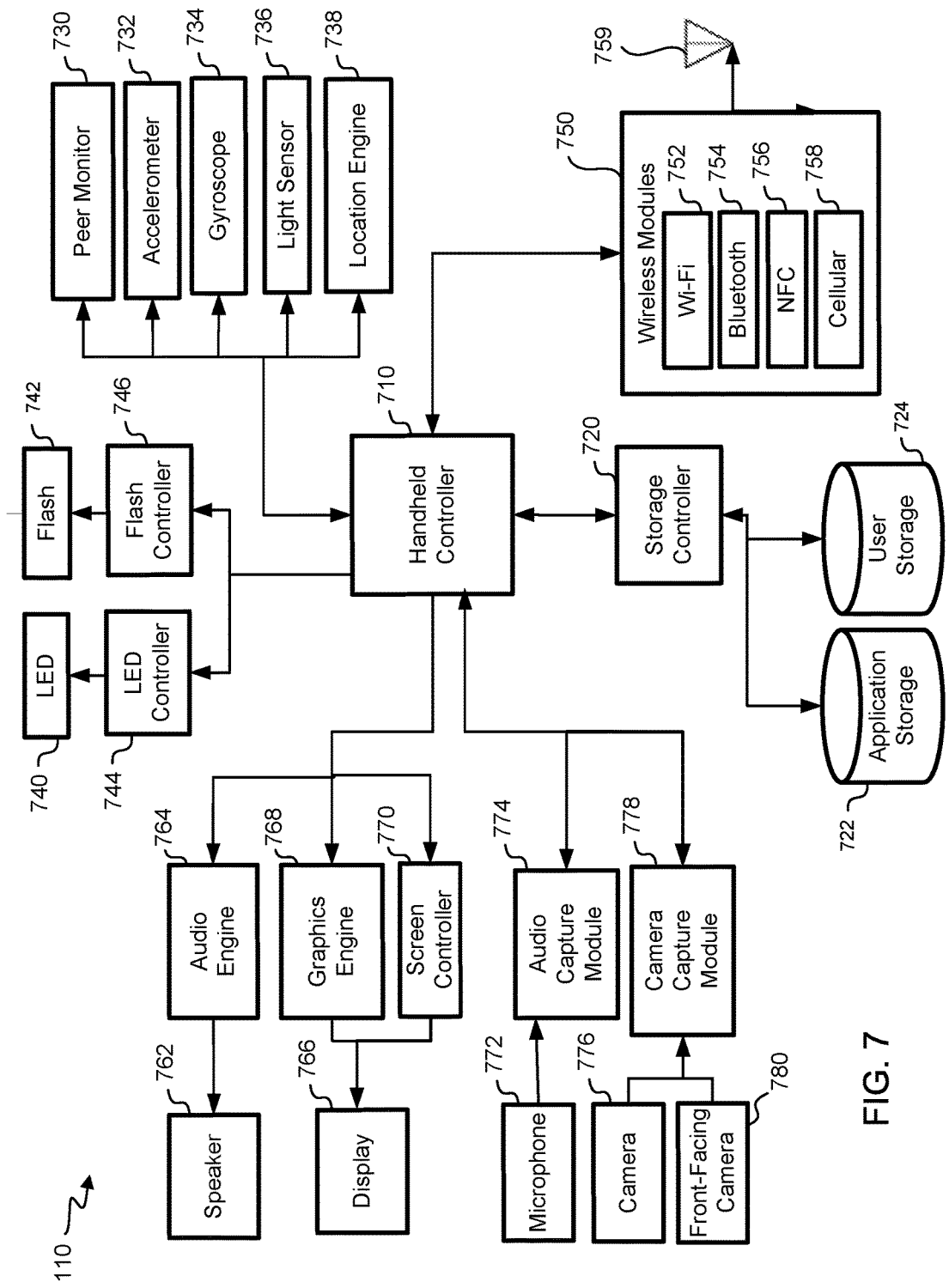
FIG. 7 shows a block diagram of user device according to an embodiment.

FIG. 7 shows a block diagram of user device 110 according to an embodiment. User device 110 includes a handheld controller 710 that can be sized and shaped so as enable the controller and user device 110 in a hand. Handheld controller 710 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 710 can communicate with a storage controller 720 so as to facilitate local storage and/or retrieval of data. It will be appreciated that handheld controller 710 can further facilitate storage and/or retrieval of data at a remote source via generation of communications including the data (e.g., with a storage instruction) and/or requesting particular data.

Storage controller 720 can be configured to write and/or read data from one or more data stores, such as an application storage 722 and/or a user storage 724. The one or more data stores can include, for example, a random access memory (RAM), dynamic random access memory (DRAM), read-only memory (ROM), flash-ROM, cache, storage chip, and/or removable memory. Application storage 722 can include various types of application data for each of one or more applications loaded (e.g., downloaded or pre-installed) onto user device 110. For example, application data can include application code, settings, profile data, databases, session data, history, cookies and/or cache data. User storage 724 can include, for example, files, documents, images, videos, voice recordings and/or audio. It will be appreciated that user device 110 can also include other types of storage and/or stored data, such as code, files and data for an operating system configured for execution on user device 110.

Handheld controller 710 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 7 shows several exemplary sensors and detection engines, including a peer monitor 730, accelerometer 732, gyroscope 734, light sensor 736 and location engine 738. Each sensor and/or detection engine can be configured to collect a measurement or make a determination, for example, at routine intervals or times and/or upon receiving a corresponding request (e.g., from a processor executing an application code).

Peer monitor 730 can monitor communications, networks, radio signals, short-range signals, etc., which can be received by a receiver of user device 110) Peer monitor 730 can, for example, detect a short-range communication from another device and/or use a network multicast or broadcast to request identification of nearby devices. Upon or while detecting another device, peer monitor 730 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 732 can be configured to detect a proper acceleration of user device 110. The acceleration may include multiple components associated with various axes and/or a total acceleration. Gyroscope 734 can be configured to detect one or more orientations (e.g., via detection of angular velocity) of user device 110. Gyroscope 734 can include, for example, one or more spinning wheels or discs, single- or multi-axis (e.g., three-axis) MEMS-based gyroscopes.

Light sensor 736 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 738 can be configured to detect (e.g., estimate) a location of user device 110. For example, location engine 738 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 738 can process signals from multiple sources and can estimate a location of user device 110 using a triangulation technique. In some instances, location engine 738 can process a single signal and estimate its location as being the same as a location of a source of the signal.

User device 110 can include a flash 742 and flash controller 746. Flash 742 can include a light source, such as (for example), an LED, electronic flash or high-speed flash. Flash controller 746 can be configured to control when flash 742 emits light. In some instances, the determination includes identifying an ambient light level (e.g., via data received from light sensor 736) and determining that flash 742 is to emit light in response to a picture- or movie-initiating input when the light level is below a defined threshold (e.g., when a setting is in an auto-flash mode). In some additional or alternative instances, the determination includes determining that flash 746 is, or is not, to emit light in accordance with a flash on/off setting. When it is determined that flash 746 is to emit light, flash controller 746 can be configured to control a timing of the light so as to coincide, for example, with a time (or right before) at which a picture or video is taken.

User device 110 can also include an LED 740 and LED controller 744. LED controller 744 can be configured to control when LED 740 emits light. The light emission may be indicative of an event, such as whether a message has been received, a request has been processed, an initial access time has passed, etc.

Flash controller 746 can control whether flash 746 emits light via controlling a circuit so as to complete a circuit between a power source and flash 746 when flash 742 is to emit light. In some instances, flash controller 746 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 750 configured to appropriately facilitate transmission or receipt of wireless signals of a particular type. Wireless modules 750 can include a Wi-Fi module 752, Bluetooth module 754, near-field communication (NFC) module 756 and/or cellular module 756. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 754 can be configured to generate and/or process radio signals with a frequency between 2.4 gigahertz and 5 gigahertz. Wi-Fi module 754 can include a wireless network interface card that includes circuitry to facilitate communicating using a particular standard (e.g., physical and/or link layer standard).

Bluetooth module 754 can be configured to generate and/or process radio signals with a frequency between 2.4 gigahertz and 2.485 gigahertz. In some instances, bluetooth module 754 can be configured to generate and/or process Bluetooth low-energy (BLE or BTLE) signals with a frequency between 2.4 gigahertz and 2.485 gigahertz.

NFC module 756 can be configured to generate and/or process radio signals with a frequency of 13.56 megahertz. NFC module 756 can include an inductor and/or can interact with one or more loop antenna.

Cellular module 758 can be configured to generate and/or process cellular signals at ultra-high frequencies (e.g., between 698 and 2690 megahertz). For example, cellular module 758 can be configured to generate uplink signals and/or to process received downlink signals.

The signals generated by wireless modules 750 can be transmitted to one or more other devices (or broadcast) by one or more antennas 759. The signals processed by wireless modules 750 can include those received by one or more antennas 759. One or more antennas 759 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 762 can be configured to present an audio output by converting an electrical signal into an audio signal. An audio engine 764 can effect particular audio characteristics, such as a volume, event-to-audio-signal mapping and/or whether an audio signal is to be avoided due to a silencing mode (e.g., a vibrate or do-not-disturb mode set at the device).

Further, a display 766 can be configured to present a visual output by converting an electrical signal into a light signal. Display 766 may include multiple pixels, each of which may be individually controllable, such that an intensity and/or color of each pixel can be independently controlled. Display 766 can include, for example, an LED- or LCD-based display.

A graphics engine 768 can determine a mapping of electronic image data to pixel variables on a screen of user device 110. It can further adjust lighting, texture and color characteristics in accordance with, for example, user settings.

In some instances, display 766 is a touchscreen display (e.g., a resistive or capacitive touchscreen) and is thus both an input and an output component. A screen controller 770 can be configured to detect whether, where and/or how (e.g., a force of) a user touched display 766. The determination may be made based on an analysis of capacitive or resistive data.

An input component can be configured to receive input from a user that can be translated into data. For example, as illustrated in FIG. 7, user device 110 can include a microphone 772 that can capture audio data and transform the audio signals into electrical signals. An audio capture module 774 can determine, for example, when an audio signal is to be collected and/or any filter, equalization, noise gate, compression and/or clipper that is to be applied to the signal.

User device 110 can further include one or more cameras 776, 780, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 776 and a front-facing camera 780.

A camera capture module 778 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 778 may further determine which camera(s) is to collect image data (e.g., based on a setting).

Figure 8:
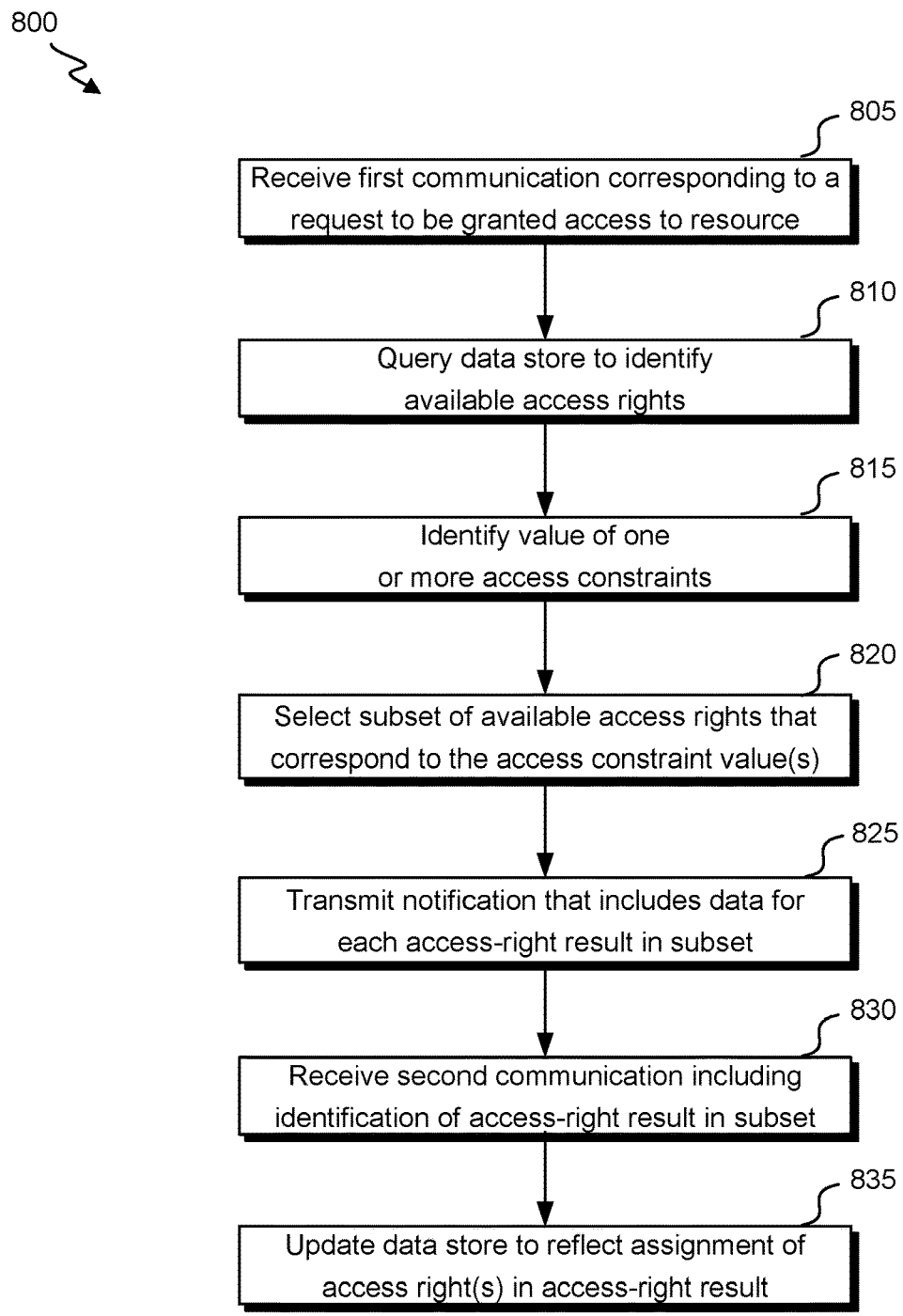
FIG. 8 illustrates a flowchart of an embodiment of a process for assigning access rights for resources.

FIG. 8 illustrates a flowchart of an embodiment of a process 800 for assigning access rights for resources. Process 800 can be performed, in part or in its entirety, by an access management system, such as access management system 120. Process 800 begins at block 805 where a communication engine 506 receives a first communication corresponding to a preliminary request to be granted access to a resource. The preliminary request can correspond to a request for information about which access rights are available for the resource and/or for characteristics of access rights available for the resource.

The first communication may be received, for example, from an intermediate system 130 or a user device 110. The first communication or a previous communication from a same device may identify a resource (e.g., via an identification of part or all of a webpage or by a resource identifier).

In some instances, the first communication can be one transmitted as a result of having received a user input (e.g., clicking a button at a resource-associated webpage). In some instances, the first communication can include an HTTP request for a particular resource-associated webpage that itself is indicative of the preliminary request.

The first request may, though need not, include at least one access-right constraints. The access-right constraint(s) can include a constraint on a characteristic of an access rights, such as (for example) a location, quality, price, or type of access right and/or an access-right quantity. A constraint may be defined by one or more values that define an endpoint of an open or closed range and/or that specify a value for an access right. For example, a constraint may identify a value indicative of a particular seating zone or a maximum price. A constraint value can include one specified based on input (e.g., user input), determined based on a user associated with the first communication (e.g., based on identifying a characteristic of each of one or more access rights assigned to the user) and/or determined based on a device or system having transmitted the first communication (e.g., to identify which access rights are available specifically to the device or system).

At block 810, resource scheduling engine 514 queries one or more data stores to identify which access rights corresponding to the resource are available. The one or more data stores can include, in various embodiments, one, more or various combinations of the data stores disclosed herein. Querying the one or more data stores can include, for example, transmitting a communication to a system or server that manages a data store of the one or more data stores and/or that executes queries of the one or more data stores. The communication can identify, for example, the resource and/or data indicating an authorization to receive a response to the query.

The one or more data stores can include a general data store, a limited data store, a cached data store and/or an authoritative data store. The data store can include one including data from a primary- and/or secondary-market channel. For example, the data store can include a shadow data store of an intermediate system and/or a data store reflecting resale offers managed at an access management system. The query can include any constraint(s) associated with the first communication.

At block 815, request management engine 512 identifies a value of each of one or more access constraints. The access-right constraint(s) can include a constraint on a characteristic of an access rights, such as (for example) a location, quality, price, or type of access right and/or an access-right quantity. In instances where the first request includes at least one access-right constraints, the types of access rights associated with constraints in the first request may, or may not, be the same types of access rights for which a value is identified at block 815. If it is, a value identified at block 815 may differ (e.g., and may more tightly constrain) from a value in the first communication.

The value of the one or more access constraint and/or which access-right characteristic the constraint pertains to can depend on, for example, previous access-right assignments associated with a device, system or user associated with the first communication; previous access-right assignments associated with a different device, system or user; which access rights are identified as being available (e.g., as a result of the query at block 810) for the resource; which access rights were available for another resource at a time of a previous assignment; and/or a load of pending access-right requests. For example, a result of the query performed at block 810 may indicate that various access rights are available, each of the identified access rights being associated with one of thirty geographical areas (e.g., sections). The access-constraint values identified at block 815 can indicate that the various access rights is to be reduced to include only those from one of four geographical areas (e.g., each being in a different seating zone and being positioned at an angular position with a high or highest correspondence of access rights previously assigned to the user or user device). As another example, an analysis of previous access-right assignments associated with the user device or user can identify a mode quantity of access rights assigned. An identified access constraint value can specify this quantity, to indicate that the various access rights are to be filtered such that each returned result is one associated with a location for which a contiguous block of access rights (the block being a size of the mode quantity) is available.

At block 820, request management engine 512 selects a subset of the available access rights. In some instances, access rights in the subset are held for a period of time to preclude the access right(s) from being assigned to another entity and/or being identified as available. The period of time may be specified based on client or operator input and/or may depend on one or more factors, such as a current, past or predicted request load and/or a quantity of access rights that remain available for the resource.

The selection can include one or more access-right results (each of which can include one or more access rights) and can be identified by implementing one or more selection techniques. For example, a selection technique may filter the available access rights down to those complying with the identified access-constraint value(s). As another (e.g., alternative or additional) example, a selection technique may include implementing a pseudo-random selection technique. As yet another (e.g., alternative or additional) example, a selection technique can be based on other communications being processed (e.g., to reduce an extent to which or to prevent having a same access included in multiple subsets). As yet another (e.g., alternative or additional) example, a first selection technique can include a first-come, first-serve technique. To illustrate, a first selection technique may indicate that one access-right result is to include a quantity of access rights associated with a particular location. A second selection technique can then identify, from amongst a set of potential results (each of which includes a contiguous quantity access rights), which one is associated with a highest quality and/or demand (e.g., based on how quickly various access rights for similar resources were previously assigned, characteristics of access rights that have already been assigned for the resource, a probability that various access rights for similar resources were assigned, access constraints identified in other requests, etc.).

In some instances, the one or more selection techniques can be applied so as to generate a subset having one or more defined subset characteristics. For example, a subset characteristic may indicate a number of access-right results to be identified in the subset. Each access-right result can correspond to a quantity of access rights (e.g., which may be the same or may differ across the subset), the access rights in the quantity being contiguous. For example, a subset characteristic may indicate that eight results are to be identified, and each result can include a set of two, contiguous access rights (e.g., with the quantity of two being identified based on an access right constraint specified in the first communication or identified at block 815).

As another example, a subset characteristic may indicate a threshold variability of results. To illustrate, subset characteristics can indicate that eight access-right results are to be returned, and that at least three of the results are to be associated with different zones or that no more than a defined number of results are to be ones associated with a high- or highest-quality of a characteristic (e.g., a high-demand location).

At block 825, communication engine 506 transmits a notification that identifies data for each access result in the subset (e.g., to a device having transmitted the first communication and/or a user device associated with the request). The notification can include an identifier of each access right in the subset and/or an identification of each of one or more characteristics (e.g., a location and/or price) of each access right in the subset. The notification can include an identification of a characteristic of each access-right result in the subset (e.g., a quantity of access rights in the access-right result). In some instances, block 825 includes transmitting part or all of a presentation or HTTP response that includes the notification, such that a receiving device can present a webpage, app page or presentation that identifies one, some or each access-right result in the subset. The presentation can include an option to select an access-right result from amongst those identified in the notification.

In some instances, the notification, a transmitted presentation and/or a presentation generated (e.g., at a user device) based on the notification may selectively include indications that access rights in the subset are available and may not include availability and/or status information about other access rights for the resource and/or other access rights identified as being available at block 810. For example, a list, table, page or other visualization structure may only identify access rights in the subset. In some instances, the notification, a transmitted presentation and/or a presentation generated (e.g., at a user device) based on the notification may indicate that a status of each access right in the subset is different than each other access right in the subset or than each other access right for the resource. To illustrate, a status of each access result in the subset may indicate that it is being held for a period of time so as to guarantee an availability for assignment, and other access rights can be identified as being associated with other statuses (e.g., available but not on hold; unavailable; assigned; unallocated; on hold for another entity; and/or unknown).

In some instances, the notification, a transmitted presentation and/or a presentation generated (e.g., at a user device) based on the notification may include an option to request a new subset selection. The option may be configured so as to introduce a new constraint or bias (e.g., to identify access rights similar to those of a given access-right result, to specify an access-right quantity or location constraint, etc.) or to generate a new subset based on one or more other factors, such as a new iteration of a pseudo-random technique or on updated access-right availability. Input corresponding to a selection of the option can return process 800 to block 820, so as to generate a different subset. A new subset can then be selected to accord with any new constraint or bias.

In some instances, the notification, a transmitted presentation and/or a presentation generated (e.g., at a user device) based on the notification may include an option (e.g., a purchase option) to identify a particular access-right result and request that the access right(s) corresponding to the result be assigned. At block 830, communication engine 506 receives a second communication (e.g., from a device having transmitted the first communication and/or a device to which the notification was transmitted) that includes an identification of an access-right result (e.g., and/or one or more access rights) in the subset. The second communication may correspond to a request that access rights corresponding to a particular access-right result be assigned to a user associated with and/or identified in the second communication.

The second communication can include and/or can be associated with data required to assign the access right(s) corresponding to the access-right result. For example, the second communication can include an identifier of a user device, which can be associated with an account, which can include information required for the assignment.

Upon receiving a communication identifying one or more access rights and/or access-right and (in some instances) upon determining that all required, an assignment process can be initiated. In some instances, an availability of the one or more access rights is confirmed.

At block 835, resource scheduling engine 514 updates the data store so as to reflect that each access right in the access-right result is assigned. Updating the data store can include, for example, transmitting a communication identifying the access right and an indication that it is to be assigned (e.g., along with an identifier of a user, user device or account to which it is to be assigned) to a system or server managing the data store.

The update can include a change in a status associated with each of the one or more access rights, associating an identifier of each of the one or more access rights or of an access-right result with an identifier of a user, intermediate system, user device, assignment time (e.g., date and/or time of day), and/or account. The assignment can include generating an access-enabling code for each access right in the access-right result or for the access-right result and/or transmitting a generated or retrieved access-enabling code (e.g., to a device having transmitted the first and/or second communication and/or to which the notification was transmitted).

Thus, process 800 provides a technique for automatically identifying and potentially holding an incomplete subset of access rights available for a resource that conform to any user-specified constraints. The subset selection may be based on learned data indicative of requests and/or assignments associated with a given user or user device and/or can depend on other selection techniques (e.g., a pseudo-random technique or a first-come, first-server technique). The subset selection can reduce instances where notifications are sent out to multiple user devices, which could result in multiple users requesting assignment of a single access right, which would require resolution of the conflict and an inability to satisfy each request. Further, subset selection techniques such as intelligent access-constraint identification (e.g., based on past assignments or requests) and/or demand-based identification can improve an efficiency and quality of a user selection.

It will be appreciated that the depicted embodiment of process 800, as is the case for all depicted processes herein is illustrative and that various modifications are contemplated. For example, to any extent to which the depiction convey an order of the actions, block 810 may be performed before or after block 815. For example, the query performed at block 810 may be performed in a manner that effects the one or more constraints identified at block 815.

Figure 9:
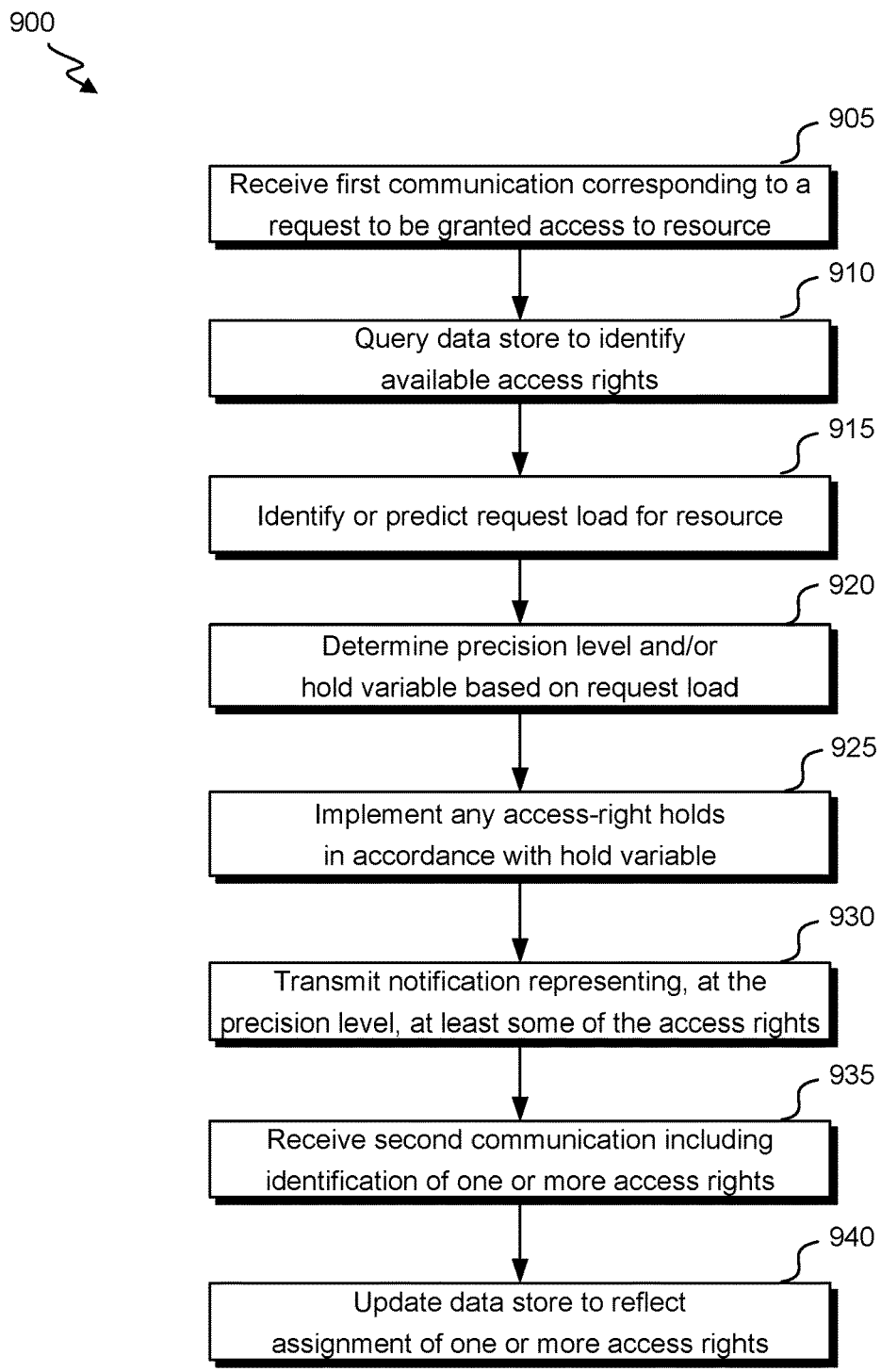
FIG. 9 illustrates a flowchart of an embodiment of a process for assigning access rights for resources.

FIG. 9 illustrates a flowchart of an embodiment of a process 900 for assigning access rights for resources. Process 900 can be performed, in part or in its entirety, by an access management system, such as access management system 120. Blocks 905 and 910 of process 900 can parallel blocks 805 and 810 of process 800.

At block 915, request management engine 512 identifies or predicts a request load (or other load-related variable) corresponding to the resource. For example, a request load can correspond to a number of received requests (for access rights, in general, for the resource or for access rights with one or more particular characteristics for the resource), a number of requests received during a particular time interval (e.g., during a previous or subsequent minute, 10 minutes, hour or day). In some instances, a predicted request load is based on and/or a load-related variable includes a number of requests previously received for and/or assignments previously made for access rights for a similar resource (e.g., sharing a performing entity, day of week, and/or location).

In some instances, a load-related variable includes or is based on a number (and/or type) of access rights assigned for the resource.

At block 920, request management engine 512 determines a precision level and/or hold variable based on the request load. The precision level can indicate how precisely a characteristic of an access right is to be identified. For example, with regard to a location characteristic, a highest level of precision may identify a precise seat in a venue; a second-highest level of precision may identify a row and section; a third-highest level of precision may identify a section; and a fourth level may identify a zone. As another example, with regard to a price characteristic, a highest level of precision may identify a precise number, while each lower level of precision may identify an iteratively larger range.

The hold variable can indicate whether some or all access rights identified in a notification are to be held for a user or user device; a number of access rights or access-right groups (e.g., each group corresponding to a location-contiguous quantity of access rights) to be held; which access rights can be held; and/or a duration of a hold. A permissive hold variable may allow holds, may allow a larger number of access rights to be held, may have fewer (or no) constraints as to which access rights cannot be held, and/or may allow access rights to be held for a longer period of time relative to a less-permissive hold variable.

When the request load (or load-related variable) identified or predicted at block 915 corresponds to a large request load, it can be determined that a precision level is to be set high and/or that a hold variable is to be permissive relate to when a load variable corresponds to a lighter load. In some instances, the determination includes evaluating a function, which may include (for example) a step function (e.g., include one or more thresholds) and/or linear function. For example, it may be determined that no holds are to be allowed when a value of a load-related variable exceeds a threshold and/or that a precision level is determined based on which of a set of ranges a load-related variable is in.

At block 925, resource scheduling engine 514 implements any access-right holds in accordance with the hold variable. The determination can include determining whether any of the access rights are to be held, which access rights are to be held, how many access rights are to be held and/or for how long access rights are to be held. In some instances, the determination can include determining whether any, how many and/or which of a set of access rights are to be held. The set of access rights can include, for example, access rights identified as a result of performance of the query at block 910, access rights which are identified so as to be identified in a notification to be transmitted to a user device, access rights included in a subset of the available access rights (e.g., the subset being identified as described with respect to block 820).

In some instances, it may be determined that some, though not all, of access rights in a set are to be held. For example, a hold variable may indicate that access rights in a highest-demand section are not to be held but other access rights can. As another example, a hold variable may indicate that two access-right groups are to held. Which groups are then held can be determined, for example, based on a degree to which groups match access-right characteristics of previously assigned access rights (e.g., to hold two groups most closely matching the characteristics) and/or a predicted or actual demand and/or quality of the groups (e.g., to hold two groups that are associated with high demand or quality, or in other instances, to hold groups that are associated with low demand or quality).

Implementing a hold for an access right can include, for example, changing a status of the access right to be a hold or unavailable status, which may prevent the access right from being identified as being available to one, some or any other device and/or which may prevent the access right from being assigned to any of one, some or any other device. A hold can be effected for a period of time, which may include an absolute time or functional time (e.g., until a session closes). A duration of the period of time may, in some instances, be determined based on the hold variable and/or may be fixed (e.g., for a given client, resource, resource characteristic and/or access-right characteristic).

At block 930, communication engine 506 transmits a notification representing, at the precision level, at least some of the access rights identified as being available at block 910. The at least some of the access rights can include all of the identified available access rights or an incomplete subset thereof (e.g., selected according to a technique described herein).

The notification can be transmitted to, for example, a device having transmitted the first communication and/or a user device associated with the request. In some instances, block 930 includes transmitting part or all of a presentation or HTTP response that includes the notification, such that a receiving device can present a webpage, app page or presentation that identifies one, some or each access-right result in the subset. The presentation can include an option to select an access-right result from amongst those identified in the notification.

In some instances, the notification can include an identifier of each access right in the at least some of the access rights. In some instances, the notification can include an indication of a characteristic of an access right (or each access right) in the at least some of the access rights or an indication of a characteristic of a group of access rights (e.g., that includes multiple contiguous access rights). The characteristic can be presented at a precision corresponding to the precision level determined at block 920.

In some instances, the notification, a transmitted presentation and/or a presentation generated (e.g., at a user device) based on the notification may include an increased-precision option to request a more precise indication of an indicated characteristic. The increased-precision option may be integrated with or separate from an option to identify a particular access right or access-right group for an assignment request. Selection of the increased-precision option may increase a level precision generally (e.g., so as to identify a more precise characteristic for each access right or access-right group identified in the notification or identified as being available in the notification) or may selectively increase the level of precision. For example, the notification, a transmitted presentation and/or a presentation generated (e.g., at a user device) based on the notification may include an increased-precision option in association with each of a set of access-right results, and selection of an option associated with a given result may trigger identifying a more precise characteristic for the result and transmitting a new or updated notification with the more precise characteristic.

In some instances, a limit constrains a degree of precision. The limit may be fixed or depend on factors such as (for example) a resource, resource location, time until potential access, quantity of remaining access rights for a resource, resource demand, request load, stage of an assignment-request processing (e.g., so as to permit an increased level of precision during later processing stages), and/or access-right characteristic.

In some instances, the notification, a transmitted presentation and/or a presentation generated (e.g., at a user device) based on the notification may include an option (e.g., a purchase option) to identify a particular access-right result and request that the access right(s) corresponding to the result be assigned. At block 935, communication engine 506 receives a second communication (e.g., from a device having transmitted the first communication and/or a device to which the notification was transmitted) including identification of one or more access rights. The second communication may correspond to a request that the one or more access rights be assigned to a user associated with and/or identified in the second communication. Block 935 in process 900 can correspond to block 830 in process 800.

At block 940, resource scheduling engine 514 updates a data store to reflect an assignment of the one or more access rights. Block 940 in process 900 can correspond to block 835 in process 800. In some instances, a characteristic of the one or more access rights is identified with an increased level of precision after receiving the second communication and/or (and potentially to a greater extent) after the one or more access rights have been assigned. One or more communications can be generated and transmitted (e.g., to a device having transmitted the second communication and/or associated with the assignment) indicating the more precise characteristic. Further, in some instances, receiving the second communication and/or assigning the one or more access rights can trigger a release of a hold of any other access rights held based on block 925.

It will be appreciated that the depicted embodiment of process 900, as is the case for all depicted processes herein is illustrative and that various modifications are contemplated. For example, rather than or in addition to a precision level and/or hold variable being determined based on the request load at block 920, a subset characteristic may be identified based on the request load. As another example, it will be appreciated that block 920 may include determining one of the precision level and the hold variable but not the other. In such instance, block 925 may be omitted from process 900 (or one or more access rights may be held according to a hold rule that does not depend on request load) and/or the notification transmitted at block 930 may represent the at least some of the access rights at a precision level that does not depend on the request load (e.g., that is fixed, at the highest level and/or determined based on a rule not depending on the request load).

As yet another example, as mentioned with respect to block 930, a notification or corresponding presentation may include an option to increase a precision of a characteristic of a particular access-right result. Selection of such an option, in some instances, may result in the data store being queried (e.g., with an additional constraint corresponding to the characteristic, at the level of precision, identified in association with the selected option). For example, a first notification may indicate that access rights (e.g., that may match one or more initial constraints, such as quantity) associated with each of six zones are available. An input can be received that corresponds to a request for increased precision with regard to a location of access rights in a first zone. The data store may then again be queried (e.g., so as to use updated status data) to identify which access rights (matching any initial constraints) are available in the first zone, and a notification may then identify one or more sections having available access rights.

As still another example, block 930 may be modified so as to transmit a notification representing characteristics of the at least some of the access rights at a level of precision higher than the determined precision level. The notification or another communication may identify the determined precision level. A software agent at the receiving device may then process the data so as to identify characteristics of the access rights at the precision level, but having the more precise data available at the receiving device may allow for increased speed and reduced system processing load should a user request a changed level of precision.

In one example of process 900, a first communication can correspond to a request to be granted access to a resource. An initial constraint can specify a greater-than-one access-right quantity and can be determined based on the first communication, a corresponding other communication, or past assignments associated with a same user or user device. A data store can be queried to identify which spatial areas are associated with at least one access-right group including a contiguous quantity of access rights, matching the specified quantity. If a number of identified spatial areas is above a threshold, the identified spatial areas may be filtered to an incomplete subset thereof (e.g., according to a subset-selection technique described herein), and the spatial areas in the subset can be transmitted to a device from which the first communication was received.

A next communication from the device may identify one of the spatial areas and correspond to a request for increased precision. The data store can then be queried again to identify which rows in the identified spatial area associated with at least one access-right group including a contiguous quantity of access rights, matching the specified quantity. If a number of identified rows is above a same or different threshold, the identified rows may be filtered to an incomplete subset thereof (e.g., according to a subset-selection technique described herein), and the rows in the subset can be transmitted to a device. The incomplete subset may include a single or multiple rows. In some instances, a status of an access-right group in each row of the subset may be changed to being held.

A subsequent communication from the device may identify one of the rows (if multiple rows were identified) and correspond to a request for increased precision and/or for assignment. The data store can then be queried again to identify which particular locations in the identified row correspond to a contiguous quantity of access rights, matching the specified quantity. Those access rights may then be assigned to a user associated with the communications (e.g., upon having received all required information).

Dynamically determining a precision level based on a request load, as detailed in process 900, can allow a system to convey broad availability data to many users. Including less precise information in notifications can reduce a need to repeatedly query data stores and tax processing resources. Further, it reduces the probability that presented availability data will be inaccurate by a time that a user acts on it. Iterative refinement of the precision may nonetheless avail precise information of interest to select users. Dynamically determining a hold variable based on a request load an also allow a system to provide users, during low loads, with time to consider and complete an assignment request and information provision without risking that access rights of interest become unavailable in the meantime. During high loads, however, holds can be limited such that large portions of available access rights not be obscured from users interested in assignments. Nonetheless, by determining the precision level and/or hold variable based on a request load, process 900 still forsakes these efficiency advantages when requests are not so high as to threaten occupying computational resources and/or to generate availability conflicts.

Figure 10:
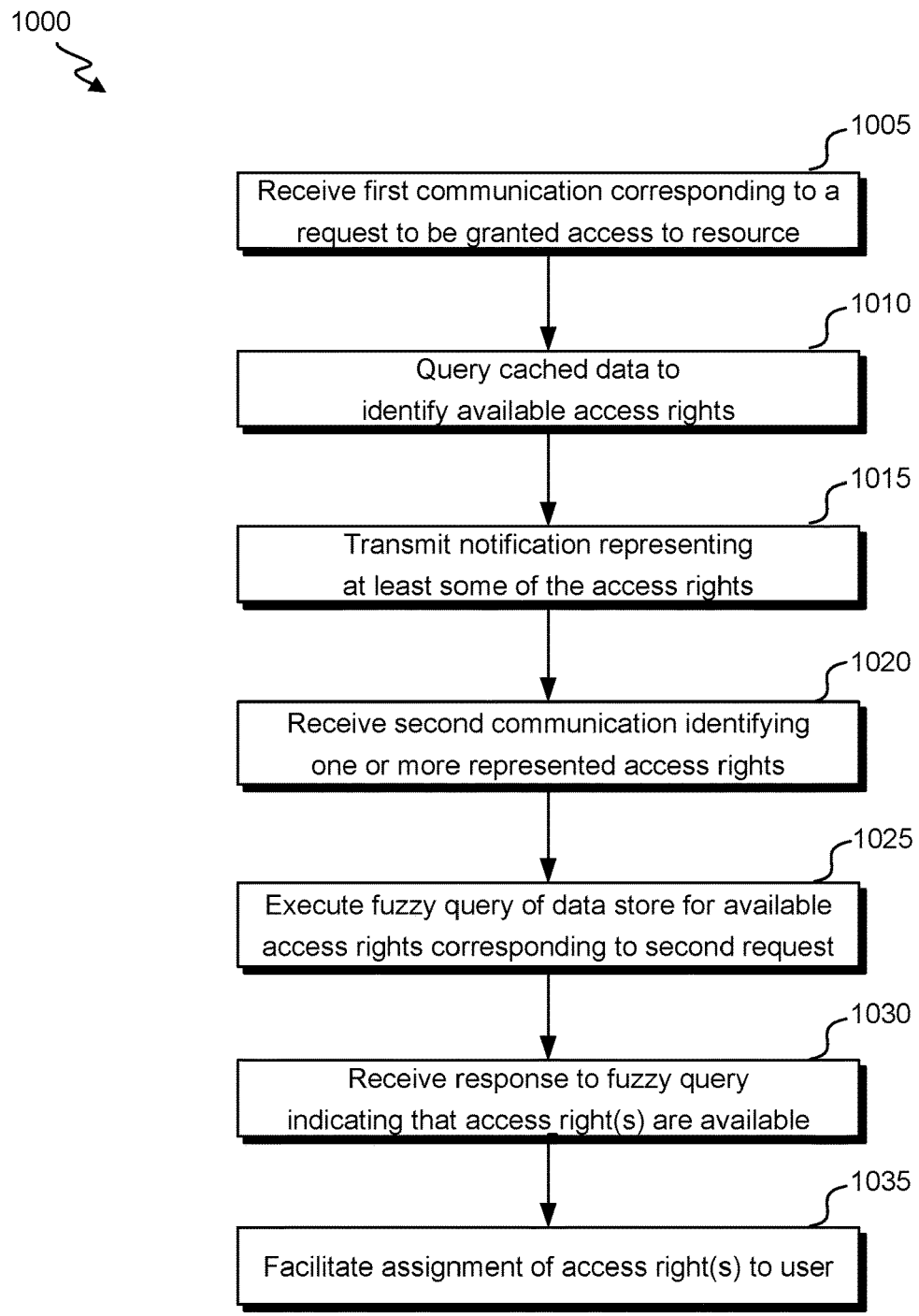
FIG. 10 illustrates a flowchart of an embodiment of a process for assigning access rights for resources.

FIG. 10 illustrates a flowchart of an embodiment of a process 1000 for assigning access rights for resources. Process 1000 can be performed, in part or in its entirety, by an access management system, such as access management system 120. Block 1005 of process 1000 can parallel block 905 of process 900 and/or block 805 of process 800.

One or more master data stores (e.g., stored at a catalog system or server) may be configured to serve as an authoritative data store for the resource, with each of the one or more master data stores authoritatively identifying a status and/or availability of some of all of the access rights for the resource. In some instances, when multiple master data stores exist for a resource, the data stores may be structured to avoid attempting to authoritatively indicate a status for a given access right's status. Querying a master data store may be required prior to assigning an access right so as to ensure that a same access right is not assigned to multiple entities. It will be appreciated that assignment restrictions, intermediate-system authorizations and distributed control may allow for multiple master data stores to exist so as to authoritatively reflect different access rights for a given resource.

At block 1010, resource scheduling engine 514 queries cached data (e.g., in a cached data structure) to identify which access rights corresponding to the resource are available. The query can include one or more constraints as specified in the first communication or corresponding communication; as determined based on one or more assignments associated with a same user, user device or account as associated with the first communication (e.g., to identify a characteristic of a recent or most-recent assignment; or to identify common characteristics of assigned access rights); as determined based on one or more assignments associated with the resource or a similar resource; based on a learning technique; etc.

A query response can include one or more query results, each of which can correspond to one access right or a group of access rights that are identified as being available and match any initial constraints. In some instances, the query result merely identifies each access right in the result, and another data structure can be used to identify one or more characteristics of the access right. In some instances, the query result includes one or more characteristics for each identified query result and/or access right represented therein.

Thus, the data queried at block 1010 can be different than a master data store that authoritatively reflects availability status. The cached data can include data generated from one or more previous queries of the master data store(s) and/or based on one or more previous data updates from one or more servers associated with the master data store(s). The cached data can be stored at a device different than one maintaining the master data store(s), such as a cache server (e.g., connected to a web server or SQL server), a server at an intermediate system, a web server or a user device. The cached data may identify a status for each of one or more access rights (e.g., which may or may not include each access right for the resource) and/or which access rights are associated with one or more particular statuses (e.g., as being available).

At block 1015, communication engine 506 transmits a notification representing, at least some of the access rights identified as being available at block 1010. The at least some of the access rights can include all of the identified available access rights or an incomplete subset thereof (e.g., selected according to a technique described herein).

The notification can be transmitted to, for example, a device having transmitted the first communication and/or a user device associated with the request. In some instances, block 1015 includes transmitting part or all of a presentation or HTTP response that includes the notification, such that a receiving device can present a webpage, app page or presentation that identifies one, some or each access-right result in the subset. The presentation can include an option to select an access-right result from amongst those identified in the notification.

In some instances, the notification can include an identifier of each access right in the at least some of the access rights. In some instances, the notification can include an indication of a characteristic of an access right (or each access right) in the at least some of the access rights or an indication of a characteristic of a group of access rights (e.g., that includes multiple contiguous access rights).

In some instances, the notification, a transmitted presentation and/or a presentation generated (e.g., at a user device) based on the notification may include an option to identify a particular access-right result and request that the access right(s) corresponding to the result be assigned. At block 1020, communication engine 506 receives a second communication (e.g., from a device having transmitted the first communication and/or a device to which the notification was transmitted) including identification of one or more access rights. The second communication may correspond to a request that the one or more access rights be assigned to a user associated with and/or identified in the second communication. Block 1020 in process 1000 can correspond to block 935 in process 900 and/or block 830 in process 800.

At block 1025, resource scheduling engine 514 executes, using fuzzy logic, a query of an authoritative data store for available access rights corresponding to the second request. More specifically, instead of or in addition to identifying whether the one or more represented access rights have remained available, the query can be conducted in a manner so as to identify an extent to which each of one or more of the available access rights (or access-right groups) correspond to characteristics of the represented access rights.

Thus, for each of the one or more available access rights or access-right groups and for characteristic evaluated using fuzzy logic, a characteristic-correspondence variable may be generated indicating a degree to which it matches a characteristic of an identified access result. When multiple characteristics are evaluated using fuzzy logic, the characteristic-correspondence variables may be used to generate a correspondence score (e.g., by summing, averaging, determining a maximum or minimum, applying an AND or OR function and/or applying a weighting). In some instances, for each of the one or more available access rights or access-right groups, each of one, more or all characteristic-correspondence variables can be compared to a threshold (e.g., which may be the same or may differ across variables) and/or the score may be compared to a threshold. A threshold may include (for example) an absolute or relative threshold and/or a fixed or dynamic threshold. For example, a threshold may be defined to be higher when a request load is higher and/or lowered as a time before a resource availability decreases.

Executing the fuzzy query can include transmitting a query to a remote server (e.g., that manages an authoritative data store) and/or querying a local data store (e.g., if the local data store includes an authoritative data store). The transmitted query may include an identification of the one or more represented access rights and/or a characteristic of each of the one or more represented access rights. The transmitted query may correspond to a request that the one or more represented be assigned.

It will be appreciated that the use of fuzzy logic may apply to one or more characteristics of access rights and/or access-right groups but not others. Which and/or how many characteristics are to be evaluated based on fuzzy logic may be determined based on a rule, which may be fixed or depend on (for example) a resource, quantity of available access rights (e.g., as identified in the cached data or authoritative data store), request load, and/or a time until a resource is available. In some instances, the query performed at block 1025 may require a characteristic match for access rights for which fuzzy logic is not to be used. In some instances, the query performance need not require such a match. Instead (for example), a correspondence score may depend on a binary indication as to whether a characteristic of an access right or access-right group matched the other characteristic.

In some instances, a response to the fuzzy query can be determined (e.g., at a data-store or query server) by identifying for which access rights (and/or groups thereof) at least one condition is met. For example, the condition may require that each access right (or group thereof) to be identified in an access-right result be associated with one or more characteristic-correspondence variables that exceed a corresponding threshold and/or with a correspondence score that exceeds a corresponding threshold. The same or a different condition may require that one or more other conditions be met, such as whether one or more associated characteristics match (e.g., exactly match) a corresponding characteristic of the represented access right(s).

In some instances, a response to the fuzzy query can be determined by ranking each of a set of access rights or each of a set of groups of access rights (e.g., each group being of a size corresponding to a quantity constraint). To illustrate, the one or more represented access rights identified in the second request may include four access rights in Section 4. A correspondence score may then be generated for each group of four contiguous access rights available and in Section 4. The groups may then be ranked based on the score, such that a group with a highest correspondence score is ranked first. The response may (but need not) include a defined number (e.g., which may be 1 or a higher number) of results, such that the response includes an identification of the n access rights or groups thereof associated with the highest rankings amongst a set of evaluated rights or groups.

At block 1030, resource scheduling engine 514 receives a response to the fuzzy query. The response may be received via communication engine 506 from a remote server (e.g., to which the query was transmitted) or from a local storage engine.

The response may include one or more access-right results, each of which identifies an access right or a group thereof that is different than the one or more represented access rights identified in the second request. The response may, in some instances, not include an access-right result that identifies the one or more represented access rights identified in the second request (e.g., when and/or because at least one of the represented access rights may no longer be available).

When the response includes multiple access-right results, a single result can be selected. For example, a result associated with a highest correspondence score may be selected, or a result associated with a highest characteristic-correspondence variable may be selected. As another example, a result associated with an extreme characteristic value within the response may be selected (e.g., selecting a result associated with a closest proximity to a resource or lowest price).

As yet another example, multiple results can be transmitted to a device associated with the first communication or the second request, such an identification of each of two or more of the multiple results can be presented so as to allow a selection of a result (e.g., which can be identified in a third received communication).

At block 1035, resource scheduling engine 514 facilitates assigning one or more access rights associated with an access-right result. For example, resource scheduling engine 514 may initiate a process by which communication engine 506 transmits one or more communications corresponding to an assignment request, including required information and/or identifying the access right(s). As another example, resource scheduling engine 514 may update a local data store to change a status of the access right(s) and/or associate an identifier of each of the access right(s) with an identifier of (for example) a user, user device or account. In some instances, the execution of the fuzzy query facilitates the assignment. For example, a request to assign the one or more represented access rights may be transmitted. Should the part or all of the one or more represented access rights no longer be available, a request response may identify an alternative access-right result. Access right(s) identified in the response may automatically be assigned in place of the represented access right(s) and/or may be assigned upon receiving a confirmation that such alternative assignment is requested.

Utilizing fuzzy queries, in accordance with process 1000, can improve a speed and efficiency at which non-empty query responses can be provided. The technique can further reduce a manually based iterative approach, which can reduce a processing load.

Figure 11:
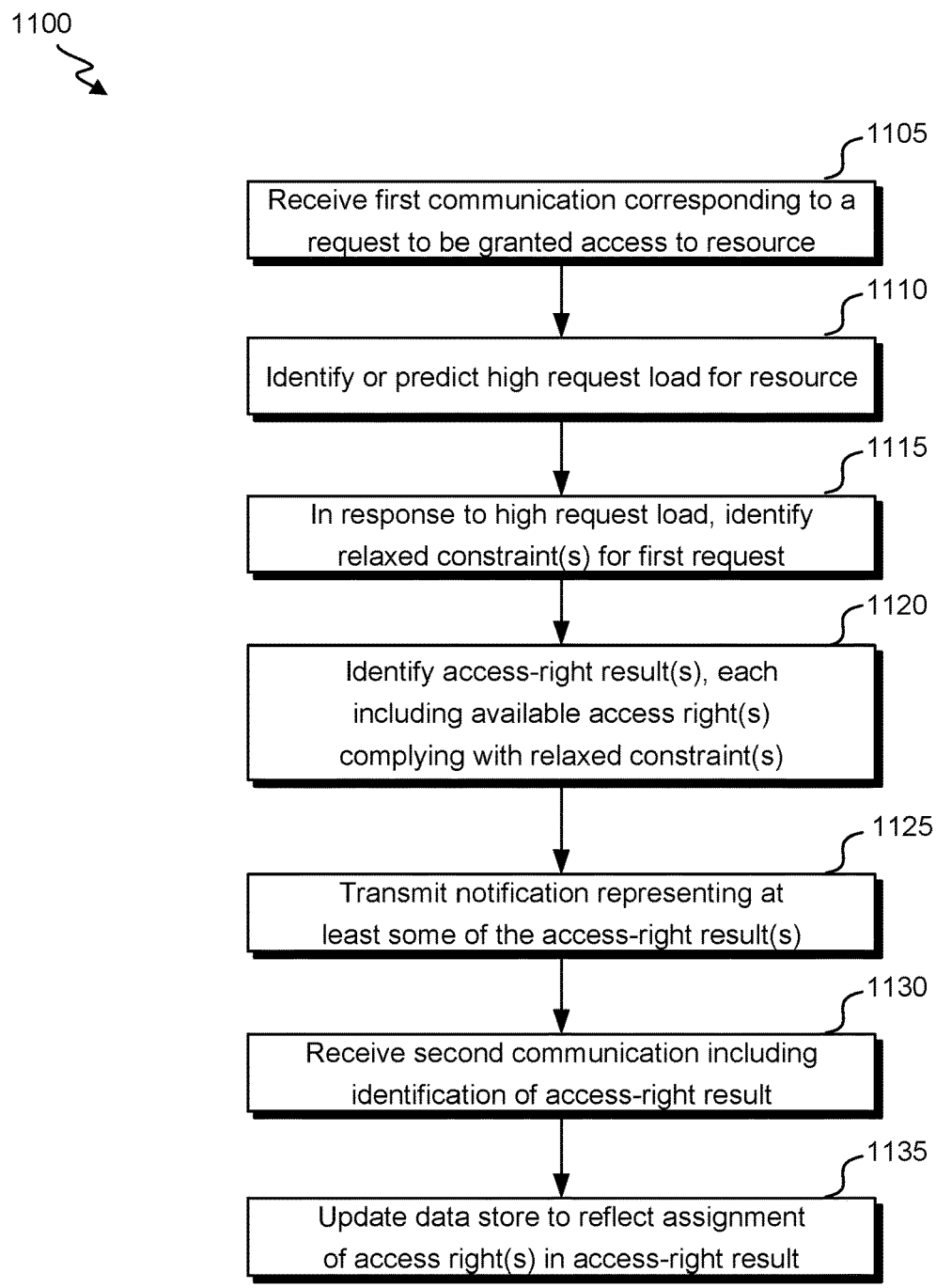
FIG. 11 illustrates a flowchart of an embodiment of a process for assigning access rights for resources.

FIG. 11 illustrates a flowchart of an embodiment of a process 1100 for assigning access rights for resources. Process 1100 can be performed, in part or in its entirety, by an access management system, such as access management system 120. Block 1105 of process 1100 can parallel block 1005 of process 1000, block 905 of process 900 and/or block 805 of process 800. Block 1110 of process 1100 can parallel block 915 of process 900.

As described herein, one or more initial constraints may be identified in association with the request. The initial constraint(s) can include one(s) included in the first communication, one(s) identified based on previous assignments, etc.

In response to a high request load, at block 1115, resource scheduling engine 514 identifies a relaxed constraint for the first request. Identifying a relaxed constraint can include, for example, removing an initial constraint; converting an initial constraint requiring an exact characteristic match to a constraint that requires that a result have a characteristic of an access-right result must match any of a set of identified characteristics or is within a range.

A rule can indicate for which characteristic(s) a constraint is to be relaxed and/or how it is to be relaxed. Such determinations may depend, for example, on a prioritized list of constraints (prioritized to indicate an order as to which corresponding constraints are to be relaxed); which access rights were previously identified as being (or as not being) available for the resource (e.g., in processing of a request communication from a different device), a value of the high request load, and/or a degree to which an initial constraint is limiting. For example, initial constraints that will seem to most restrictively decrease the number of access rights that can be returned may be identified as being the first ones to relax. As another example, a performing device may have received a previous query response that indicates that there are no available access rights for accessing a resource at a particular time. Accordingly, a constraint on identifying the resource and/or a resource time may be relaxed.

At block 1120, resource scheduling engine 514 identifies one or more access-right results, each of which comply with any non-relaxed initial constraints and relaxed constraints. For example, if initial constraints indicated that access-right results were to include a quantity of four contiguous access rights; each being priced under a hundred dollars and in zone 1; and if block 1115 included removing the price constraint and expanding the zone constraint to be zone 1 or zone 2; then block 1120 could include identifying one or more contiguous block of four access rights in zone 1 or 2.

In some instances, the identification can include, for example, facilitating an execution of a query of a local or remote data store to look for only those available access rights complying with the constraint(s). In some instances, the identification can include facilitating an execution of a query for all available access rights and to process a response of the query to identify access rights or groups thereof complying with the constraint(s). In some instances, a set of initial access-right results may be identified, each of which includes one or more available access rights that comply with the constraints. A set of access-right results may be defined to be the set of initial access-right results or may include, for example, a subset thereof (e.g., so as to identify a particular number of results should a size of the set of initial results exceed the number).

Block 1125 can generally parallel block 825 of process 800, though rather than the transmitted notification representing each access-right result in a subset, the notification can represent at least some (or all) of the access-right result(s) identified at block 1120. Blocks 1130 and 1135 of process 1100 can parallel blocks 830 and 835, respectively, of process 800.

Relaxing constraints, in accordance with process 1100, can improve a speed and efficiency at which non-empty query responses can be provided. The technique can further reduce a manually based iterative approach, which can reduce a processing load.

Figure 12:
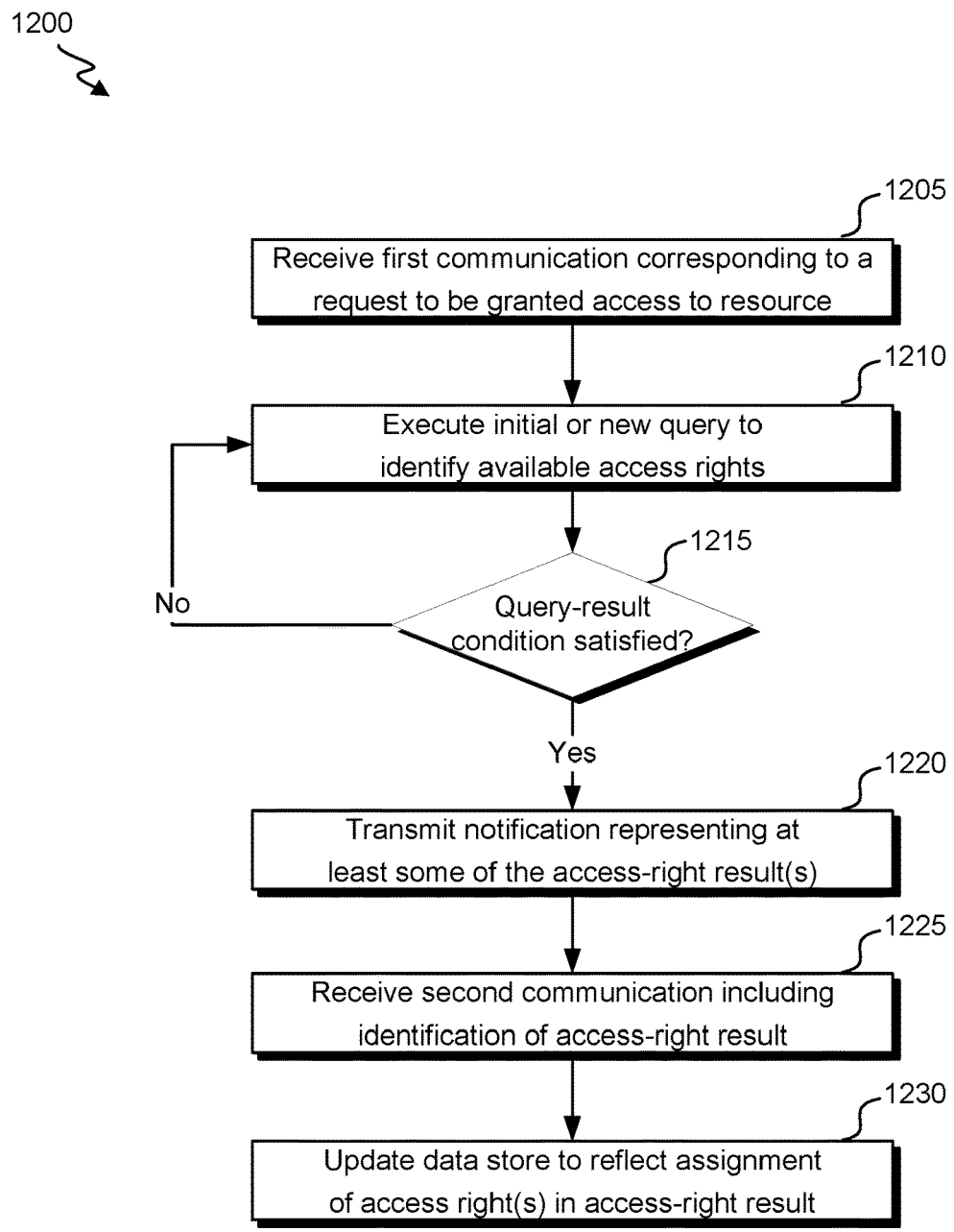
FIG. 12 illustrates a flowchart of an embodiment of a process for assigning access rights for resources.

FIG. 12 illustrates a flowchart of an embodiment of a process 1200 for assigning access rights for resources. Process 1200 can be performed, in part or in its entirety, by an access management system, such as access management system 120. Blocks 1205, 1220, 1225 and 1230 of process 1200 can parallel (for example) blocks 1105, 1125, 1130 and 1135, respectively, of process 1100.

However, blocks 1210 and blocks 1215 of process 1200 indicate an iterative query approach. During a first iteration, at block 1210, resource scheduling engine 514 executes an initial query to identify available access rights. As indicated herein, executing the query can include querying a local data store or transmitting a communication to a remote device corresponding to a request to query a remote data store. The initial query can include any type of query, such as those described herein. In one example instance, the initial query includes one or more initial constraints (e.g., as identified in the first communication or a corresponding communication or as determined based on other information). In one example instance, the initial query includes one or more relaxed constraints.

In some instances, a data-store query is first performed without effecting constraints, and the constraints are imposed post-hoc. In some instances, a query is performed so as to restrict results to those complying with the constraints.

At block 1215, it is determined whether a query-result condition is satisfied. The query-result condition can include, for example, an upper and/or lower threshold number of query results, where each query results includes a quantity of (e.g., contiguous) access rights. As another (alternative or additional) example, the query-result condition can include a threshold variability of a characteristic of an access right or query result across those returned as a result of the query. As yet another example, the query-result condition can a threshold match score. To illustrate, for each query result, it can be determined an extent to which one or more characteristics associated with the result match a characteristic from a previous assignment associated with a same user or user device and/or from an assignment profile (e.g., generated based on a set of past assignments associated with a same user or user device and/or with one or more other users).

The query-result condition may be dynamic, in that it can change in time or circumstance. For example, a threshold value can depend on a time until a resource is available or a quantity of access rights remaining available for a resource.

When it is determined that the query-result condition is satisfied, process 1200 can continue to block 1220. When it is determined that condition is not satisfied, process 1200 can automatically return to block 1210. A new query can then be executed. As one example, the new query may include one or more constraints more relaxed or more constrained than in a previous query. As another example, the new query may include one or more fewer or additional constraints. As yet another example, the new query may include one that is performed on a different data store than a previous query (e.g., an authoritative data store instead of a cached data store or the converse). As still another example, the new query may include a fuzzy query, while a previous query may not have included a fuzzy query or a degree of a fuzzy query (e.g., a number of variables for which an exact or defined match or correspondence is required) may have been reduced.

The iterative querying in process 1200 can facilitate returning at least some access-right results, even if initial constraints cannot be satisfied and/or a request load is high. Other conditions can also be implemented so as to promote assignment objectives, such as achieving a target distribution characteristic of assigned access rights. Further yet, iteratively querying different data stores can control and/or distribute a load on a given data store.

It will be appreciated that the depicted processes are illustrative and that various modifications are transmitted. For example, part or all of a process may be performed at a user device and/or a device managing a data store with access-right availability data. In either instance, some depicted actions may be unnecessary (e.g., an action could be locally performed and/or an input could be detected rather than relying on inter-device communications) and/or additional actions may be appropriate (e.g., so as to detect a local input or send a transmission with an instruction to perform a particular action). It will also be appreciated that a process described herein may include a distributed process where various actions are performed by different devices.

It will also be appreciated that multiple actions (in a single process or across multiple processes) may be reordered or combined. For example, there are multiple techniques and operation orders to identify available access rights that comply with one or more defined constraints (e.g., a query can be structured so as to include the constraint(s) or available access rights may first be identified and then filtered based on the constraint(s)). Further, in some instances, an iterative query may process results of a previous query rather than or in addition to performing a new query.

Figure 13A:
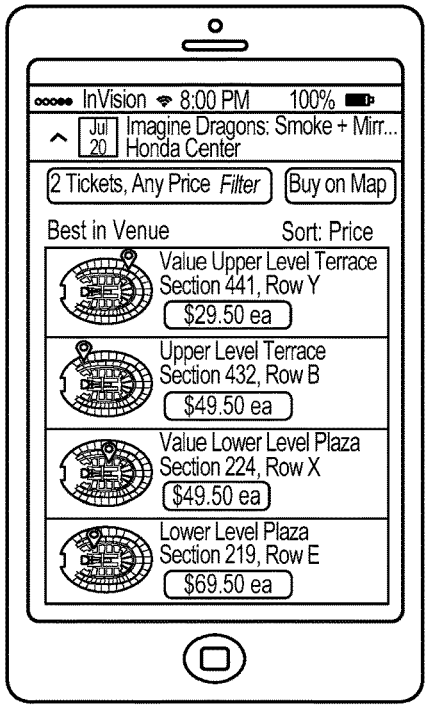
FIGS. 13A-13C illustrate example interfaces at a user device that show access-right results and a constraint-defining interface.
Figure 13B:
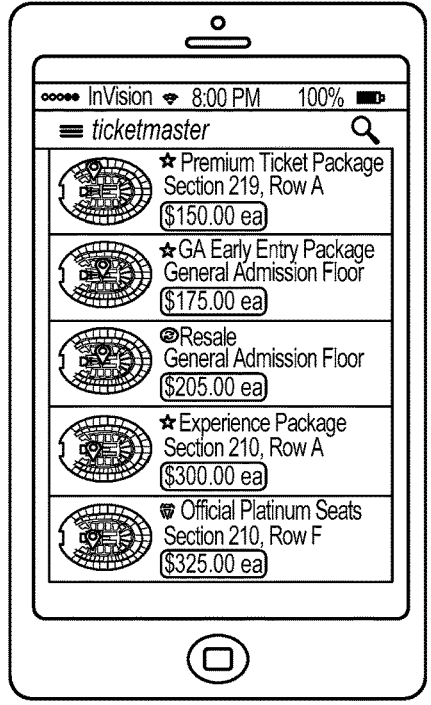
Figure 13C:
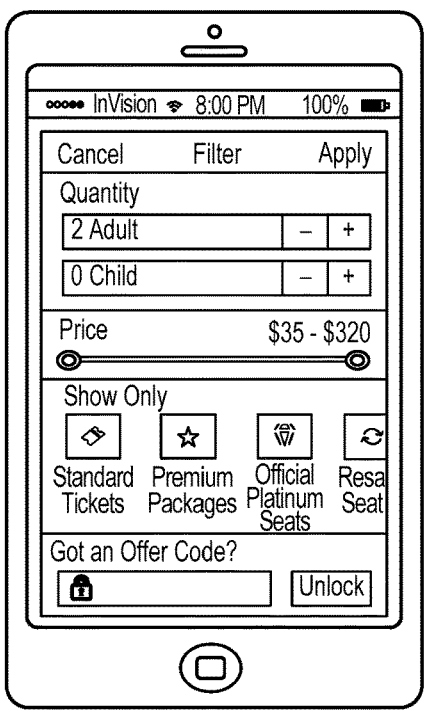

FIGS. 13A-13C illustrate example interfaces at a user device that show access-right results and a constraint-defining interface. In this example, upon identifying a resource to be a July 20$^{th}$ show of Imagine Dragons at the Honda Center (e.g., based on receipt of user input at the device selecting the resource), it is determined whether and/or what initial constraints are to be imposed. In this example, the initial constraints are automatically identified based on past assignments associated with a user account, and it is determined that no price constraint will be set and that an access-right quantity, indicating a number of contiguous access rights to be included in results, is to be set to two. A query is performed (e.g., at a remote server) so as to identify preliminary access-right results complying with the quantity constraint.

It will be appreciated that the query may be performed across multiple data stores. For example, the query may be performed across primary- and secondary-market access rights. In some instances, an access-right result may even include a combination of one or more access rights from the primary channel and one or more access rights from the secondary channel. In such instances, should the characteristics of individual access rights in the result differ, the characteristics may be individually identified or a combination (e.g., sum or average) or extreme (e.g., earliest, lowest quality, latest, highest) of the characteristic may be presented.

A subset selection technique is then implemented (e.g., at the remote server or at the user device) so as to identify ten access-results from the preliminary access-right results. The subset selection technique may include a pseudo-random element and/or may select the subset in a manner such that a variability of a characteristic across the subset is above a relative or absolute threshold (e.g., within a top 10% of possible variability values given the preliminary results). The subset selection technique may also include a bias towards characteristic values (e.g., sections) corresponding to previous assignments associated with an account.

Nine of the ten access-right results in the subset are represented in FIGS. 13A and 13B. Each representation includes an identification of a location characteristic. Notably, the location characteristic is presented at a level of precision that is not the most detailed level of precision. One advantage of the reduced precision is that, should particular access rights become unavailable before a user can request assignment of those particular rights, a query could then attempt to identify other access rights that may even exactly match the characteristics as represented in the initial notification.

As illustrated in FIG. 13C, one or more initial constraints can be modified via input. For example, an input can specify a precise value for a characteristic (e.g., with respect to a quantity), one or more endpoints of a range (e.g., with respect to price) and/or one or more binary selections. Upon receiving the inputs, a new query (or a new processing of preliminary query results) may be performed, and a new or updated notification can be presented.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for processing assignments of electronic tickets to events by server load-based representation of access-right characteristics, the method comprising:
    identifying a request load for an event, the request load representing a processing load imposed on a server by a quantity of requests received from one or more user devices, each request of the quantity of requests requesting one or more electronic tickets to the event during a time period, each electronic ticket of the one or more electronic tickets being associated with a characteristic that characterizes the electronic ticket, and characteristic being representable at a plurality of levels of precision;
    determining a level of precision, from amongst the plurality of levels of precision, for representing the characteristic in response to receiving the quantity of requests, one or more requests of the quantity of requests being for unassigned electronic tickets to the event, the level of precision being determined individually for each request of the one or more requests, the level of precision being determined based on the request load existing at a time of receiving each request of the one or more requests during the time period, and the level of precision indicating how precisely the characteristic is presented to user devices in response to queries for unassigned electronic tickets to the event;
    receiving a first communication from a user device, the first communication corresponding to a request to query the server for unassigned electronic tickets to the event;
    identifying an initial access constraint that specifies a value or a range of the characteristic of unassigned electronic tickets, the initial access constraint being identified based on the first communication;
    in response to identifying the initial access constraint, querying a data store for one or more unassigned electronic tickets that satisfy the initial access constraint;
    in response to the querying, receiving a query response including a set of electronic tickets, each electronic ticket in the set of electronic tickets being unassigned and satisfying the initial access constraint;
    generating one or more result variables, each result variable of the one or more result variables representing the characteristic of an electronic ticket from amongst the set of electronic tickets, and the representation of the characteristic of each electronic ticket in the set of electronic tickets being in accordance with the determined level of precision of the plurality of levels of precision; and
    transmitting a second communication to the user device, the second communication including the one or more result variables.

2. The computer-implemented method for facilitating assignments of electronic tickets to events by facilitating query execution and filtering query results, as recited in claim 1, wherein:
    the characteristic of the electronic tickets is a location within a venue, and
    the determined level of precision is selected from amongst a plurality of levels of precision including a first level of precision and a second level of precision, the first level of precision identifying a first spatial area associated with the electronic ticket, the second level of precision identifying a second spatial area associated with the electronic ticket, and the first spatial area being smaller than the second spatial area.

3. The computer-implemented method for facilitating assignments of electronic tickets to events by facilitating query execution and filtering query results, as recited in claim 1, wherein identifying the request load includes predicting a load-related variable associated with the event, the prediction being based on a number of requests previously received for the event or a similar event.

4. The computer-implemented method for facilitating assignments of electronic tickets to events by facilitating query execution and filtering query results, as recited in claim 1, further comprising:
    determining a hold variable based on an identified load-related variable, the hold variable being selected from amongst a plurality of hold variables, and each hold variable of the plurality of hold variables indicating whether at least one electronic ticket associated with the one or more result variables is to be held for the user device; and
    executing a hold on the at least one electronic ticket associated with the one or more result variables in accordance with the determined hold variable.

5. The computer-implemented method for facilitating assignments of electronic tickets to events by facilitating query execution and filtering query results, as recited in claim 4, wherein the plurality of hold variables includes a first hold variable and a second hold variable, the first hold variable enabling electronic tickets to be held for a longer period of time relative to the second hold variable.

6. The computer-implemented method for facilitating assignments of electronic tickets to events by facilitating query execution and filtering query results, as recited in claim 1, wherein one or more data stores include indications about which electronic tickets are available via a primary channel and which access rights are available via a secondary channel.

7. The computer-implemented method for facilitating assignments of electronic tickets to events by facilitating query execution and filtering query results, as recited in claim 1, wherein an incomplete subset of the set of electronic tickets is identified by selecting a defined number of electronic tickets from amongst all unassigned electronic tickets.

8. A system for processing assignments of electronic tickets to events by server load-based representation of access-right characteristics, comprising:
    one or more data processors; and
    a non-transitory computer-readable storage medium containing instructions which, when executed on the one or more data processors, cause the one or more data processors to perform operations including:
        identifying a request load for an event, the request load representing a processing load imposed on a server by a quantity of requests received from one or more user devices, each request of the quantity of requests requesting one or more electronic tickets to the event during a time period, each electronic ticket of the one or more electronic tickets being associated with a characteristic that characterizes the electronic ticket, and characteristic being representable at a plurality of levels of precision;

determining a level of precision, from amongst the plurality of levels of precision, for representing the characteristic in response to receiving the quantity of requests, one or more requests of the quantity of requests being for unassigned electronic tickets to the event, the level of precision being determined individually for each request of the one or more requests, the level of precision being determined based on the request load existing at a time of receiving each request of the one or more requests during the time period, and the level of precision indicating how precisely the characteristic is presented to user devices in response to queries for unassigned electronic tickets to the event;

receiving a first communication from a user device, the first communication corresponding to a request to query the server for unassigned electronic tickets to the event;

identifying an initial access constraint that specifies a value or a range of the characteristic of unassigned electronic tickets, the initial access constraint being identified based on the first communication;

in response to identifying the initial access constraint, querying a data store for one or more unassigned electronic tickets that satisfy the initial access constraint;

in response to the querying, receiving a query response including a set of electronic tickets, each electronic ticket in the set of electronic tickets being unassigned and satisfying the initial access constraint;

generating one or more result variables, each result variable of the one or more result variables representing the characteristic of an electronic ticket from amongst the set of electronic tickets, and the representation of the characteristic of each electronic ticket in the set of electronic tickets being in accordance with the determined level of precision of the plurality of levels of precision; and transmitting a second communication to the user device, the second communication including the one or more result variables.

9. The system for facilitating assignments of electronic tickets to events by facilitating query execution and filtering query results, as recited in claim 8, wherein:
the characteristic of the electronic tickets is a location within a venue, and
the determined level of precision is selected from amongst a plurality of levels of precision including a first level of precision and a second level of precision, the first level of precision identifying a first spatial area associated with the electronic ticket, the second level of precision identifying a second spatial area associated with the electronic ticket, and the first spatial area being smaller than the second spatial area.

10. The system for facilitating assignments of electronic tickets to events by facilitating query execution and filtering query results, as recited in claim 8, wherein identifying the request load includes predicting a load-related variable associated with the event, the prediction being based on a number of requests previously received for the event or a similar event.

11. The system for facilitating assignments of electronic tickets to events by facilitating query execution and filtering query results, as recited in claim 8, wherein the operations further include:
determining a hold variable based on an identified load-related variable, the hold variable being selected from amongst a plurality of hold variables, and each hold variable of the plurality of hold variables indicating whether at least one electronic ticket associated with the one or more result variables is to be held for the user device; and
executing a hold on the at least one electronic ticket associated with the one or more result variables in accordance with the determined hold variable.

12. The system for facilitating assignments of electronic tickets to events by facilitating query execution and filtering query results, as recited in claim 11, wherein the plurality of hold variables includes a first hold variable and a second hold variable, the first hold variable enabling electronic tickets to be held for a longer period of time relative to the second hold variable.

13. The system for facilitating assignments of electronic tickets to events by facilitating query execution and filtering query results, as recited in claim 8, wherein one or more data stores include indications about which electronic tickets are available via a primary channel and which access rights are available via a secondary channel.

14. The system for facilitating assignments of electronic tickets to events by facilitating query execution and filtering query results, as recited in claim 8, wherein an incomplete subset of the set of electronic tickets is identified by selecting a defined number of electronic tickets from amongst all unassigned electronic tickets.

15. A computer-program product tangibly embodied in a non-transitory machine-readable storage medium, including instructions configured to cause a data processing apparatus to perform operations including:
identifying a request load for an event, the request load representing a processing load imposed on a server by a quantity of requests received from one or more user devices, each request of the quantity of requests requesting one or more electronic tickets to the event during a time period, each electronic ticket of the one or more electronic tickets being associated with a characteristic that characterizes the electronic ticket, and characteristic being representable at a plurality of levels of precision;
determining a level of precision, from amongst the plurality of levels of precision, for representing the characteristic in response to receiving the quantity of requests, one or more requests of the quantity of requests being for unassigned electronic tickets to the event, the level of precision being determined individually for each request of the one or more requests, the level of precision being determined based on the request load existing at a time of receiving each request of the one or more requests during the time period, and the level of precision indicating how precisely the characteristic is presented to user devices in response to queries for unassigned electronic tickets to the event;
receiving a first communication from a user device, the first communication corresponding to a request to query the server for unassigned electronic tickets to the event;

identifying an initial access constraint that specifies a value or a range of the characteristic of unassigned electronic tickets, the initial access constraint being identified based on the first communication;

in response to identifying the initial access constraint, querying a data store for one or more unassigned electronic tickets that satisfy the initial access constraint;

in response to the querying, receiving a query response including a set of electronic tickets, each electronic ticket in the set of electronic tickets being unassigned and satisfying the initial access constraint;

generating one or more result variables, each result variable of the one or more result variables representing the characteristic of an electronic ticket from amongst the set of electronic tickets, and the representation of the characteristic of each electronic ticket in the set of electronic tickets being in accordance with the determined level of precision of the plurality of levels of precision; and transmitting a second communication to the user device, the second communication including the one or more result variables.

16. The computer-program product as recited in claim 15, wherein:

the characteristic of the electronic tickets is a location within a venue, and the determined level of precision is selected from amongst a plurality of levels of precision including a first level of precision and a second level of precision, the first level of precision identifying a first spatial area associated with the electronic ticket, the second level of precision identifying a second spatial area associated with the electronic ticket, and the first spatial area being smaller than the second spatial area.

17. The computer-program product as recited in claim 15, wherein identifying the request load includes predicting a load-related variable associated with the event, the prediction being based on a number of requests previously received for the event or a similar event.

18. The computer-program product as recited in claim 15, wherein the operations further comprise:

determining a hold variable based on an identified load-related variable, the hold variable being selected from amongst a plurality of hold variables, and each hold variable of the plurality of hold variables indicating whether at least one electronic ticket associated with the one or more result variables is to be held for the user device; and executing a hold on the at least one electronic ticket associated with the one or more result variables in accordance with the determined hold variable.

19. The computer-program product as recited in claim 18, wherein the plurality of hold variables includes a first hold variable and a second hold variable, the first hold variable enabling electronic tickets to be held for a longer period of time relative to the second hold variable.

20. The computer-program product as recited in claim 15, wherein one or more data stores include indications about which electronic tickets are available via a primary channel and which access rights are available via a secondary channel.

* * * * *